US012749800B2

(12) United States Patent
Kim et al.

(10) Patent No.: US 12,749,800 B2
(45) Date of Patent: Sep. 29, 2026

(54) ELECTRONIC DEVICE COMPRISING ANTENNA AND SEGMENT STRUCTURE

(71) Applicant: Samsung Electronics Co., Ltd., Suwon-si (KR)

(72) Inventors: Youngjung Kim, Suwon-si (KR); Jaehyung Kim, Suwon-si (KR); Sanghoon Choi, Suwon-si (KR); Jonghoon Kim, Suwon-si (KR); Hua Li, Suwon-si (KR); Minseok Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/822,869

(22) Filed: Sep. 3, 2024

(65) Prior Publication Data

US 2024/0429593 A1 Dec. 26, 2024

Related U.S. Application Data

(63) Continuation of application No. PCT/KR2023/002937, filed on Mar. 3, 2023.

(30) Foreign Application Priority Data

Mar. 4, 2022 (KR) ........................ 10-2022-0028359
Apr. 11, 2022 (KR) ........................ 10-2022-0044844

(51) Int. Cl.
*H01Q 1/24* (2006.01)
*H01Q 9/04* (2006.01)
*H01Q 21/08* (2006.01)

(52) U.S. Cl.
CPC .......... *H01Q 1/243* (2013.01); *H01Q 9/0407* (2013.01); *H01Q 21/08* (2013.01)

(58) Field of Classification Search
None
See application file for complete search history.

(56) References Cited

U.S. PATENT DOCUMENTS

| | | | |
|---|---|---|---|
| 6,853,336 | B2 | 2/2005 | Asano et al. |
| 11,202,365 | B2 | 12/2021 | Kim et al. |

(Continued)

FOREIGN PATENT DOCUMENTS

| | | | |
|---|---|---|---|
| JP | 2002-084117 | A | 3/2002 |
| KR | 10-2020-0008647 | A | 1/2020 |

(Continued)

OTHER PUBLICATIONS

Extended European Search Report dated Apr. 25, 2025, issued in a European Patent Application No. 23763739.2.

(Continued)

*Primary Examiner* — Crystal L Hammond
(74) *Attorney, Agent, or Firm* — Jefferson IP Law, LLP

(57) ABSTRACT

An electronic device is provided. The electronic device includes a housing including a first surface facing a front side of the electronic device, a second surface opposite to the first surface, and a peripheral part surrounding a space between the first surface and the second surface and including a conductive portion and a first non-conductive portion contacted with an end portion of the conductive portion, and an antenna module including a substrate, in the housing, disposed in a direction parallel to a portion of the peripheral part and a plurality of antenna elements disposed on a surface of the substrate and spaced apart from each other in the direction, wherein, when the peripheral part is viewed vertically, the peripheral part includes a first region overlapping the antenna module and a second region including the conductive portion having a thickness greater than a thickness of the conductive portion included in the first region, and wherein, when the peripheral part is viewed (Continued)

vertically, the first non-conductive portion overlaps one of the plurality of antenna elements in the first region.

20 Claims, 17 Drawing Sheets

(56) References Cited

U.S. PATENT DOCUMENTS

| | | | | |
|---|---|---|---|---|
| 11,283,180 | B2 | 3/2022 | Kim et al. | |
| 11,545,735 | B2 | 1/2023 | Lee et al. | |
| 11,600,897 | B2 | 3/2023 | Moon et al. | |
| 11,955,699 | B2 | 4/2024 | Seo et al. | |
| 12,009,599 | B2 | 6/2024 | Khripkov et al. | |
| 12,300,876 | B2 | 5/2025 | Park et al. | |
| 2019/0312334 | A1 | 10/2019 | Shin et al. | |
| 2021/0126344 | A1* | 4/2021 | Jeon | H01Q 1/38 |
| 2021/0159599 | A1 | 5/2021 | Park et al. | |
| 2021/0280981 | A1 | 9/2021 | Kim et al. | |
| 2021/0367319 | A1 | 11/2021 | Moon et al. | |
| 2021/0376449 | A1 | 12/2021 | Park | |
| 2022/0059928 | A1 | 2/2022 | Leutheuser et al. | |
| 2022/0224021 | A1 | 7/2022 | Song et al. | |
| 2022/0376380 | A1 | 11/2022 | Park et al. | |
| 2023/0420826 | A1 | 12/2023 | Kim et al. | |

FOREIGN PATENT DOCUMENTS

| | | | |
|---|---|---|---|
| KR | 10-2239723 | B1 | 4/2021 |
| KR | 10-2021-0048342 | A | 5/2021 |
| KR | 10-2021-0093198 | A | 7/2021 |
| KR | 10-2021-0100738 | A | 8/2021 |
| KR | 10-2022-0098598 | A | 7/2022 |
| KR | 10-2022-0101835 | A | 7/2022 |
| KR | 10-2418533 | B1 | 7/2022 |
| KR | 10-2462850 | B1 | 11/2022 |
| WO | 2021/162262 | A1 | 8/2021 |
| WO | 2022/191452 | A1 | 9/2022 |

OTHER PUBLICATIONS

International Search Report and Written Opinion dated Jun. 1, 2023, issued in International Patent Application No. PCT/KR2023/002937.

Korean Office Action dated Jun. 1, 2026, issued in Korean Patent Application No. 10-2022-0044844.

* cited by examiner

ELECTRONIC DEVICE COMPRISING ANTENNA AND SEGMENT STRUCTURE

CROSS-REFERENCE TO RELATED APPLICATION(S)

This application is a continuation application, claiming priority under § 365(c), of an International application No. PCT/KR2023/002937, filed on Mar. 3, 2023, which is based on and claims the benefit of a Korean patent application number 10-2022-0028359, filed on Mar. 4, 2022, in the Korean Intellectual Property Office, and of a Korean patent application number 10-2022-0044844, filed on Apr. 11, 2022, in the Korean Intellectual Property Office, the disclosure of each of which is incorporated by reference herein in its entirety.

BACKGROUND

1. Field

The disclosure relates to an electronic device including an antenna and a segmented structure.

2. Description of Related Art

An electronic device may transmit a wireless signal through an antenna or receive a wireless signal through an antenna. As the frequency bands of wireless signals used in electronic devices are diversified, a plurality of antennas are included in the electronic devices. For example, an electronic device may include an antenna module therein or may feed power to a conductive portion of a segmented structure of housing to use the conductive portion as an antenna.

The above information is presented as background information only to assist with an understanding of the disclosure. No determination has been made, and no assertion is made, as to whether any of the above might be applicable as prior art with regard to the disclosure.

SUMMARY

Electromagnetic waves radiating from antenna elements of an antenna module may be reflected by a conductive material disposed in its propagation path. Due to an interaction of the electromagnetic waves with a conductive portion, the performance (e.g., sensitivity) of the antenna module may be degraded. To reduce the performance degradation of the antenna module, a thickness of a portion overlapping the antenna module may be formed to be thinner than a thickness of another portion, or an opening may be arranged therein.

When a conductive portion of a housing is utilized as an antenna, the housing may be designed to avoid overlapping of the antenna module and the conductive portion. Such a design may avoid placing the conductive portion in a path of electromagnetic waves radiating from the antenna elements, but it may be difficult to secure a length of an electrical signal to utilize the conductive portion as an antenna.

Aspects of the disclosure are to address at least the above-mentioned problems and/or disadvantages and to provide at least the advantages described below. Accordingly, an aspect of the disclosure is to provide a non-conductive portion in a housing portion overlapping the antenna module to reduce the effect of the conductive portion on electromagnetic waves radiating from the antenna module, and have a conductive portion of a certain length or longer.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a first surface facing a front side of the electronic device, a second surface opposite to the first surface, and a peripheral part surrounding a space between the first surface and the second surface and including a conductive portion and a first non-conductive portion contacted with an end portion of the conductive portion, and an antenna module including a substrate, in the housing, disposed in a direction parallel to a portion of the peripheral part, and a plurality of antenna elements disposed on a surface of the substrate, spaced apart from each other in the direction, wherein, when the peripheral part is viewed vertically, the peripheral part includes a first region overlapping the antenna module and a second region including the conductive portion having a thickness greater than a thickness of the conductive portion included in the first region, and wherein, when the peripheral part is viewed vertically, the first non-conductive portion overlaps one of the plurality of antenna elements in the first region.

In accordance with another aspect of the disclosure, an electronic device is provided. The electronic device includes a housing including a first conductive portion disposed on a portion of a first side and a portion of a second side perpendicular to the first side, a second conductive portion spaced apart from the first conductive portion, and a non-conductive portion disposed between the first conductive portion and the second conductive portion, and an antenna module including a substrate, in the housing, disposed in a direction parallel to the second side, and a plurality of antenna elements spaced apart from each other on one surface of the substrate in the direction, and wireless communication circuitry electrically connected to the antenna module and the conductive portion, wherein, when the second side is viewed vertically, the non-conductive portion overlaps one of the plurality of antenna elements.

The electronic device includes a housing including a non-conductive portion in a portion overlapping an antenna element (e.g., a patch antenna) disposed on an antenna module. Electromagnetic waves emitted from the antenna element is transmitted to the outside of the electronic device, through the non-conductive portion.

In the electronic device according to an embodiment of the disclosure, a thickness of the conductive portion overlapping the antenna module is relatively thick, in order to transmit the electromagnetic waves emitted from the antenna module to the outside of the housing. The thickness of the conductive portion overlapping the antenna module is such that a path of an electrical signal for the conductive portion to operate as an antenna can be formed. Even if the thickness of the conductive portion is formed relatively thick, the electronic device transmits and/or receive a wireless communication signal in a relatively low frequency band through the conductive portion, by securing a length of the conductive portion of a predetermined length or more.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

Figure 1:
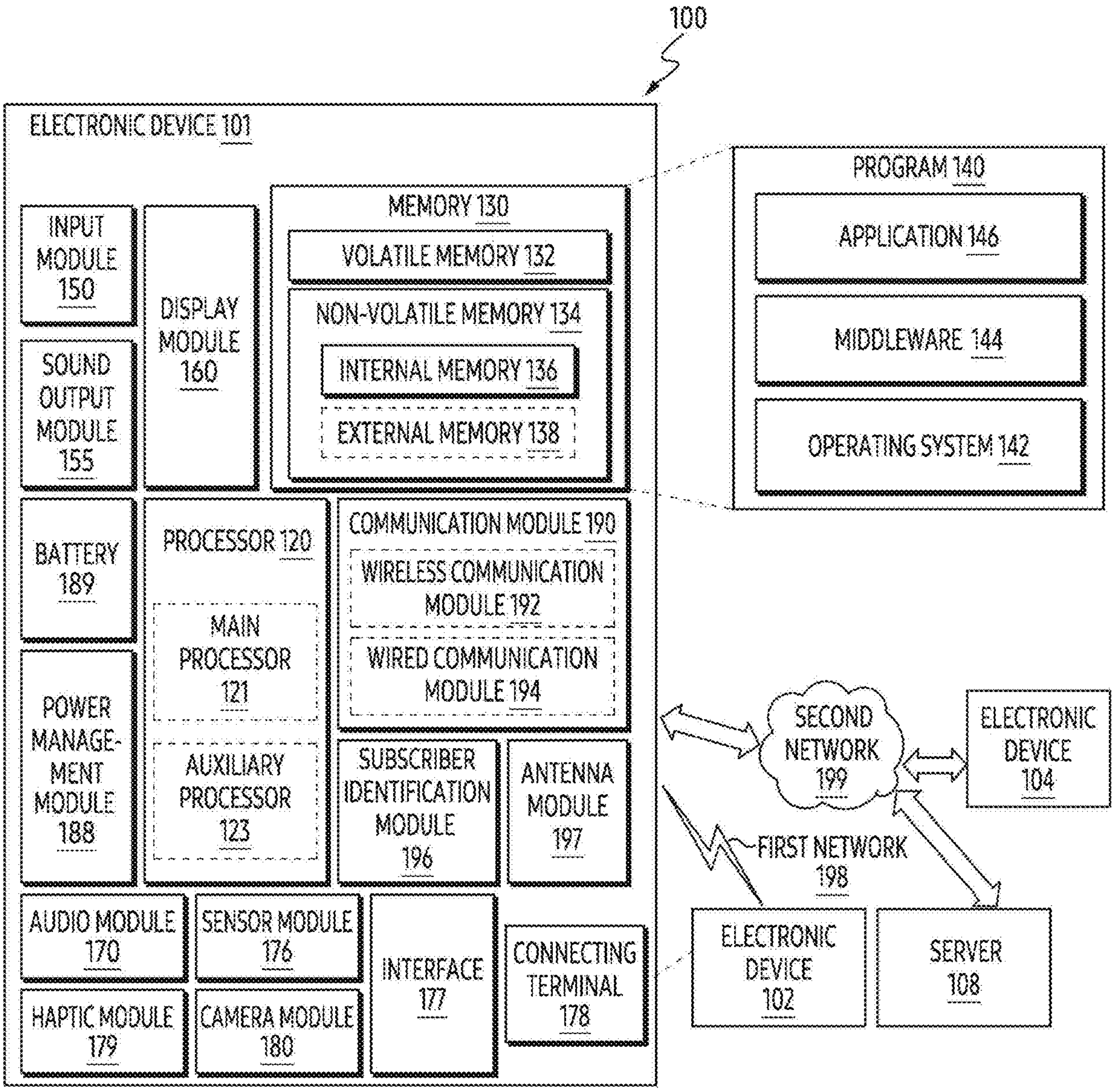
FIG. 1 is a block diagram of an electronic device in a network environment according to an embodiment of the disclosure.

FIG. 1 is a block diagram of an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
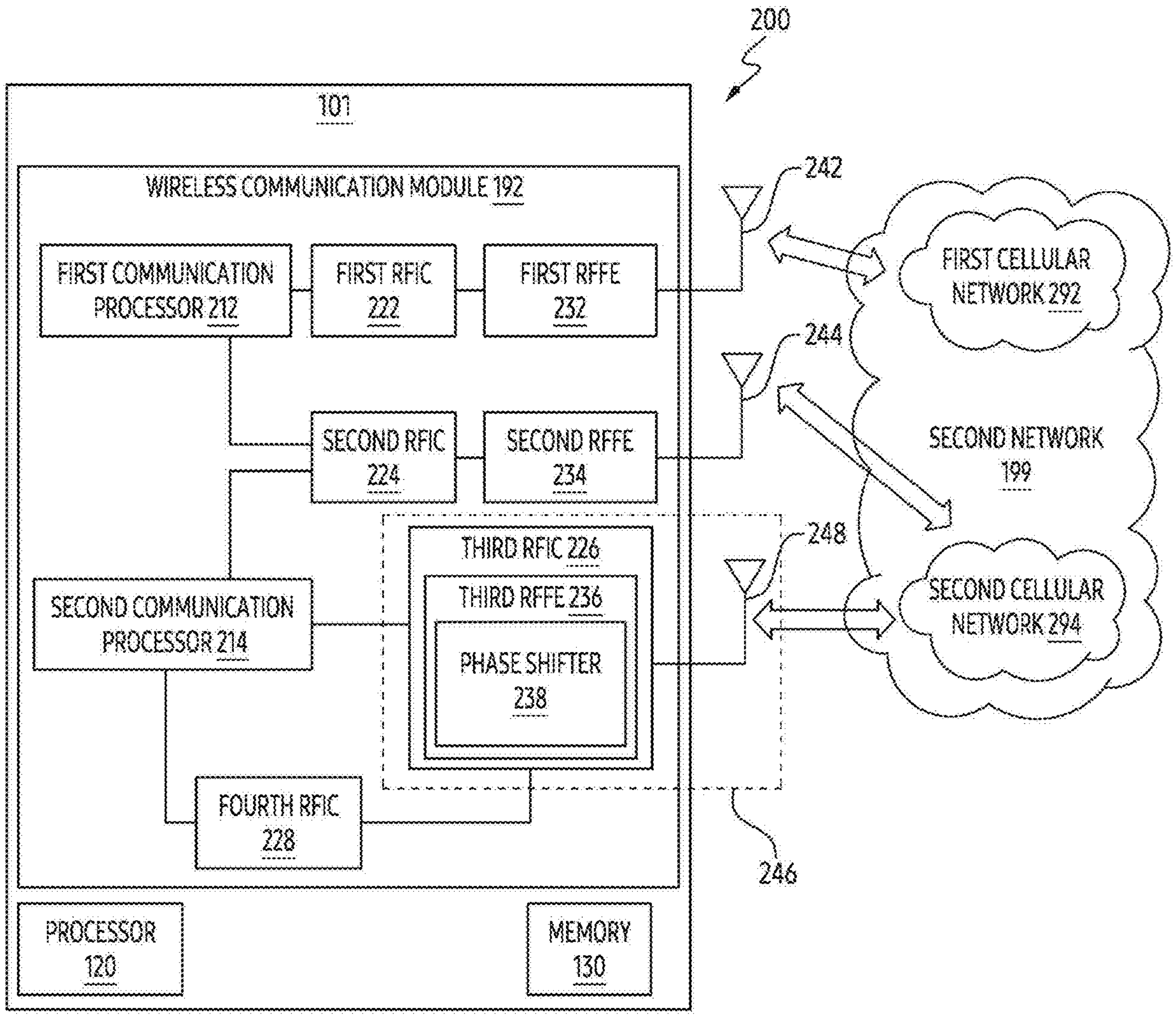
FIG. 2 is a block diagram of an electronic device for supporting legacy network communication and fifth generation (5G) network communication according to an embodiment of the disclosure.

FIG. 2 is a block diagram 200 of an electronic device for supporting legacy network communication and 5G network communication according to an embodiment of the disclosure.

Referring to FIG. 2, the electronic device 101 may include a first communication processor 212, a second communication processor 214, a first radio frequency integrated circuit (RFIC) 222, a second RFIC 224, and a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The second network 199 may include a first cellular network 292 and a second cellular network 294. According to another embodiment of the disclosure, the electronic device 101 may further include at least one of the components illustrated in FIG. 1, and the second network 199 may further include at least one other network. According to an embodiment of the disclosure, the first communication processor 212, the second communication processor 214, the first RFIC 222, the second RFIC 224, the fourth RFIC 228, the first RFFE 232, and the second RFFE 234 may constitute at least a part of a wireless communication module 192. According to another embodiment of the disclosure, the fourth RFIC 228 may be omitted or may be included as a part of the third RFIC 226.

The first communication processor 212 may support the establishment of a communication channel of a band to be used for wireless communication with the first cellular network 292 and legacy network communication through the established communication channel. According to various embodiments of the disclosure, the first cellular network 292 may be a legacy network including a 2nd generation (2G), 3rd generation (3G), 4th generation (4G), and/or long-term evolution (LTE) network. The second communication processor 214 may support the establishment of a communication channel corresponding to a specified band (e.g., approximately 6 GHz to 60 GHz) among bands to be used for wireless communication with the second cellular network 294, and 5G network communication through the established communication channel. According to various embodiments of the disclosure, the second cellular network 294 may be a 5G network defined by $3^{rd}$ Generation Partnership Project (3GPP). Additionally, according to an embodiment of the disclosure, the first communication processor 212 or the second communication processor 214 may support the establishment of a communication channel corresponding to another specified band (e.g., approximately 6 GHz or less) among bands to be used for wireless communication with the second cellular network 294, and 5G network communication through the established communication channel. According to an embodiment of the disclosure, the first communication processor 212 and the second communication processor 214 may be implemented in a single chip or a single package. According to various embodiments of the disclosure, the first communication processor 212 or the second communication processor 214 may be formed with the processor 120, the auxiliary processor 123 of FIG. 1, or the communication module 190 in a single chip or a single package.

Upon transmission, the first RFIC 222 may convert a baseband signal generated by the first communication processor 212 into a radio frequency (RF) signal of approximately 700 MHz to approximately 3 GHz used in the first cellular network 292 (e.g., a legacy network). Upon reception, an RF signal may be obtained from the first cellular network 292 (e.g., a legacy network) through an antenna (e.g., the first antenna module 242), and may be preprocessed through an RFFE (e.g., the first RFFE 232). The first RFIC 222 may convert the preprocessed RF signal into a baseband signal so as to be processed by the first communication processor 212.

Upon transmission, the second RFIC 224 may convert a baseband signal generated by the first communication processor 212 or the second communication processor 214 into an RF signal (hereinafter, referred to as a 5G Sub6 RF signal) of the Sub6 band (e.g., approximately 6 GHz or less) used in the second cellular network 294 (e.g., the 5G network). Upon reception, a 5G Sub6 RF signal may be obtained from the second cellular network 294 (e.g., the 5G network) through an antenna (e.g., the second antenna module 244), and may be preprocessed through an RFFE (e.g., the second RFFE 234). The second RFIC 224 may convert the preprocessed 5G Sub6 RF signal into a baseband signal so as to be processed by a corresponding one of the first communication processor 212 or the second communication processor 214.

The third RFIC 226 may convert a baseband signal generated by the second communication processor 214 into an RF signal (hereinafter, referred to as a 5G Above6 RF signal) of the 5G Above6 band (e.g., approximately 6 GHz to approximately 60 GHz) to be used in the second cellular network 294 (e.g., the 5G network). Upon reception, a 5G Above6 RF signal may be obtained from the second cellular network 294 (e.g., the 5G network) through an antenna (e.g., the antenna 248), and may be preprocessed through the third RFFE 236. For example, the third RFFE 236 may perform preprocessing of the signal by using a phase shifter 238. The third RFIC 226 may convert the preprocessed 5G Above6 RF signal into a baseband signal so as to be processed by the second communication processor 214. According to an embodiment of the disclosure, the third RFFE 236 may be formed as a part of the third RFIC 226.

According to an embodiment of the disclosure, the electronic device 101 may include the fourth RFIC 228 separately from or at least as a part of the third RFIC 226. In this case, the fourth RFIC 228 may convert the baseband signal generated by the second communication processor 214 into an RF signal (hereinafter, referred to as an intermediate frequency (IF) signal) of an intermediate frequency band (e.g., approximately 9 GHz to approximately 11 GHz), and then transmit the IF signal to the third RFIC 226. The third RFIC 226 may convert the IF signal into a 5G Above6 RF signal. Upon reception, a 5G Above6 RF signal may be received from the second cellular network 294 (e.g., the 5G network) through an antenna (e.g., the antenna 248), and may be converted into an IF signal by the third RFIC 226. The fourth RFIC 228 may convert the IF signal into the baseband signal so as to be processed by the second communication processor 214.

According to an embodiment of the disclosure, the first RFIC 222 and the second RFIC 224 may be implemented as a single chip or at least a part of a single package. According to an embodiment of the disclosure, the first RFFE 232 and the second RFFE 234 may be implemented as a single chip or at least a part of a single package. According to an embodiment of the disclosure, at least one of the first antenna module 242 or the second antenna module 244 may be omitted or combined with another antenna module to process RF signals of a plurality of corresponding bands.

According to an embodiment of the disclosure, the third RFIC 226 and the antenna 248 may be disposed on the same substrate to form a third antenna module 246. For example, the wireless communication module 192 or the processor 120 may be disposed on a first substrate (e.g., a main PCB). In this case, the third RFIC 226 may be disposed in a partial region (e.g., the lower surface) of a second substrate (e.g., a sub PCB) separate from the first substrate, and the antenna 248 may be disposed in another partial region (e.g., the upper surface) to form the third antenna module 246. According to an embodiment of the disclosure, the antenna 248 may include, for example, an antenna array that may be used for beamforming. By disposing the third RFIC 226 and the antenna 248 on the same substrate, it is possible to reduce the length of the transmission line therebetween. This, for example, may reduce the loss (e.g., attenuation) of a signal in a high frequency band (e.g., approximately 6 GHz to approximately 60 GHz) used for 5G network communication by the transmission line. Accordingly, the electronic device 101 may improve the quality or speed of communication with the second cellular network 294 (e.g., the 5G network).

The second cellular network 294 (e.g., the 5G network) may be operated independently of (e.g., Stand-Alone (SA)) or operated to be connected to (e.g., Non-Stand Alone (NSA)) the first cellular network 292 (e.g., the legacy network). For example, in the 5G network, there may be only an access network (e.g., 5G radio access network (RAN) or next-generation RAN (NG RAN)) and no core network (e.g., next-generation core (NGC)). In this case, after accessing the access network of the 5G network, the electronic device 101 may access an external network (e.g., the Internet) under the control of a core network (e.g., evolved packed core (EPC)) of the legacy network. Protocol information for communication with the legacy network (e.g., LTE protocol information) or protocol information for communication with the 5G network (e.g., New Radio (NR) protocol information) may be stored in the memory 230 and may be accessed by other components (e.g., the processor 120, the first communication processor 212, or the second communication processor 214).

Figure 3:
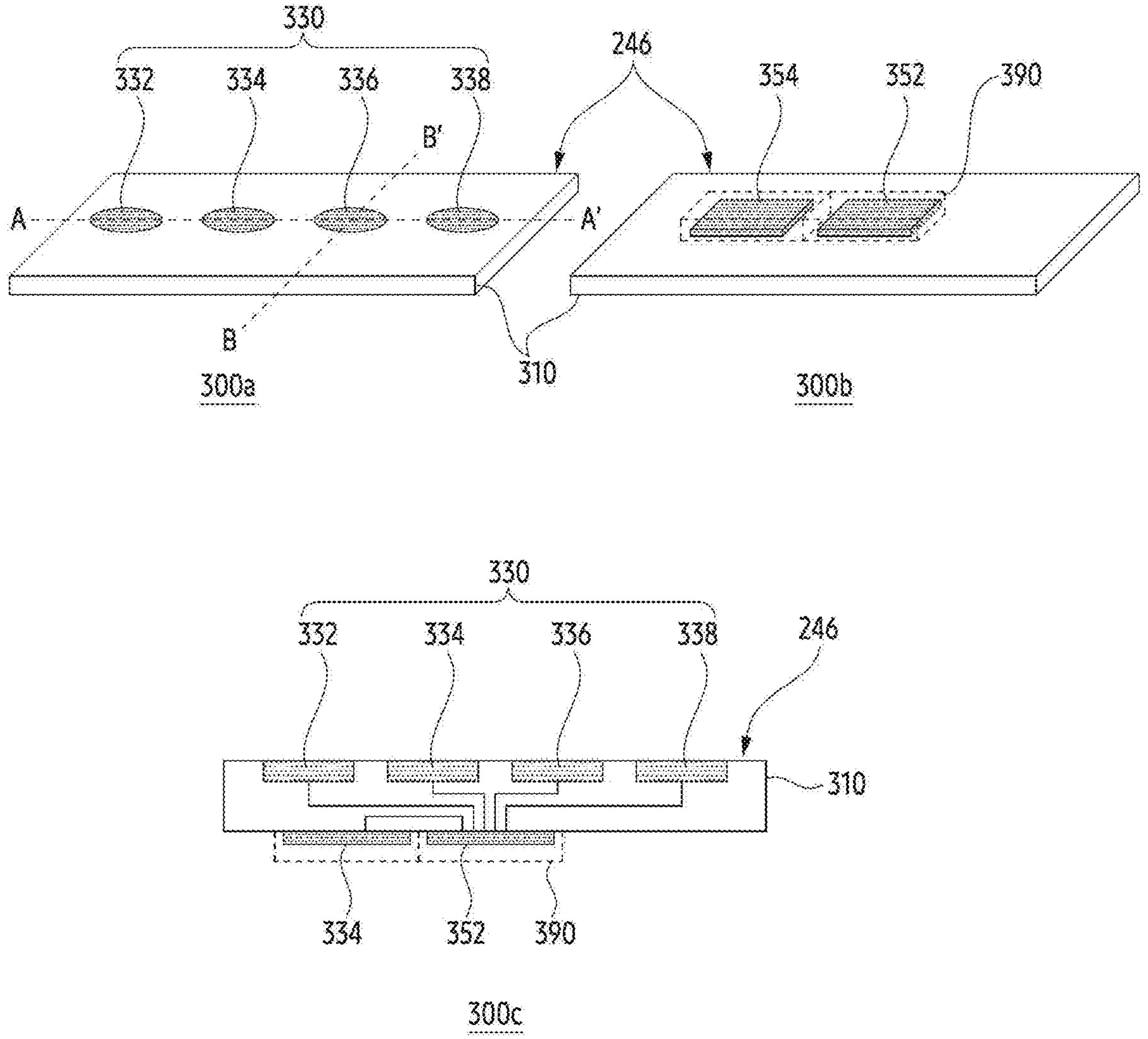
FIG. 3 is a diagram illustrating an embodiment of a structure of a third antenna module described with reference to FIG. 2 according to an embodiment of the disclosure.

FIG. 3 illustrates, for example, an embodiment of a structure of the third antenna module 246 described with reference to FIG. 2 according to an embodiment of the disclosure. 300*a* of FIG. 3 is a perspective view of the third antenna module 246 as viewed from one side, and 300*b* of FIG. 3 is a perspective view of the third antenna module 246 as viewed from the other side. 300*c* of FIG. 3 is a cross-sectional view of A-A' of the third antenna module 246.

Referring to FIG. 3, in an embodiment of the disclosure, the third antenna module 246 may include a printed circuit board 310, an antenna array 330, a radio frequency integrated circuit (RFIC) 352, and a power manage integrated circuit (PMIC) 354, and a module interface (not shown). The third antenna module 246 may further optionally include a shielding member 390. In other embodiments of the disclosure, at least one of the aforementioned parts may be omitted, or at least two of the parts may be integrally formed.

The printed circuit board 310 may include a plurality of conductive layers and a plurality of non-conductive layers alternately stacked with the conductive layers. The printed circuit board 310 may provide electrical connection between various electronic components disposed on the printed circuit board 310 and/or outside, by using wires and conductive vias formed on the conductive layer.

The antenna array 330 (e.g., 248 in FIG. 2) may include a plurality of antenna elements 332, 334, 336, or 338 arranged to form a directional beam. The antenna elements may be formed on a first surface of the printed circuit board 310 as illustrated. According to another embodiment of the disclosure, the antenna array 330 may be formed inside the printed circuit board 310. According to embodiments of the disclosure, the antenna array 330 may include a plurality of antenna arrays (e.g., a dipole antenna array and/or a patch antenna array) of the same or different shape or type.

The RFIC 352 (e.g., the third RFIC 226 in FIG. 2) may be disposed in another region of the printed circuit board 310 (e.g., a second surface opposite to the first surface), spaced apart from the antenna array 330. The RFIC 352 may be configured to process a signal of a selected frequency band that is transmitted and received via the antenna array 330. According to an embodiment of the disclosure, upon transmission, the RFIC 352 may convert a baseband signal obtained from a communication processor (not illustrated) into an RF signal of a specified band. Upon reception, the RFIC 352 may convert an RF signal received via the antenna array 330 into a baseband signal and transmit the converted signal to the communication processor.

According to another embodiment of the disclosure, upon transmission, the RFIC 352 may up-convert an IF signal (e.g., approximately 9 GHz to approximately 11 GHz) obtained from an intermediate frequency integrated circuit (IFIC) (e.g., the fourth RFIC 228 in FIG. 2) into the RF signal of the selected band. Upon reception, the RFIC 352 may down-convert the RF signal obtained via the antenna array 330 into an IF signal, and transmit the converted signal to the IFIC.

The PMIC 354 may be disposed in another partial region (e.g., the second surface) of the printed circuit board 310, spaced apart from the antenna array. The PMIC 354 may receive a voltage from a main PCB (not shown) and provide power required for various components (e.g., the RFIC 352) on antenna modules.

The shielding member 390 may be disposed on a part (e.g., the second surface) of the printed circuit board 310 in order to electromagnetically shield at least one of the RFIC 352 and the PMIC 354. According to an embodiment of the disclosure, the shielding member 390 may include a shield can.

Although not illustrated, in various embodiments of the disclosure, the third antenna module 246 may be electrically connected to another printed circuit board (e.g., the main circuit board) through the module interface. The module interface may include a connection member, for example, a coaxial cable connector, a board-to-board connector, an interposer, or a flexible printed circuit board (FPCB). Using the connection member, the RFIC 352 and/or the PMIC 354 of the third antenna module 246 may be electrically connected to the printed circuit board.

Figure 4:
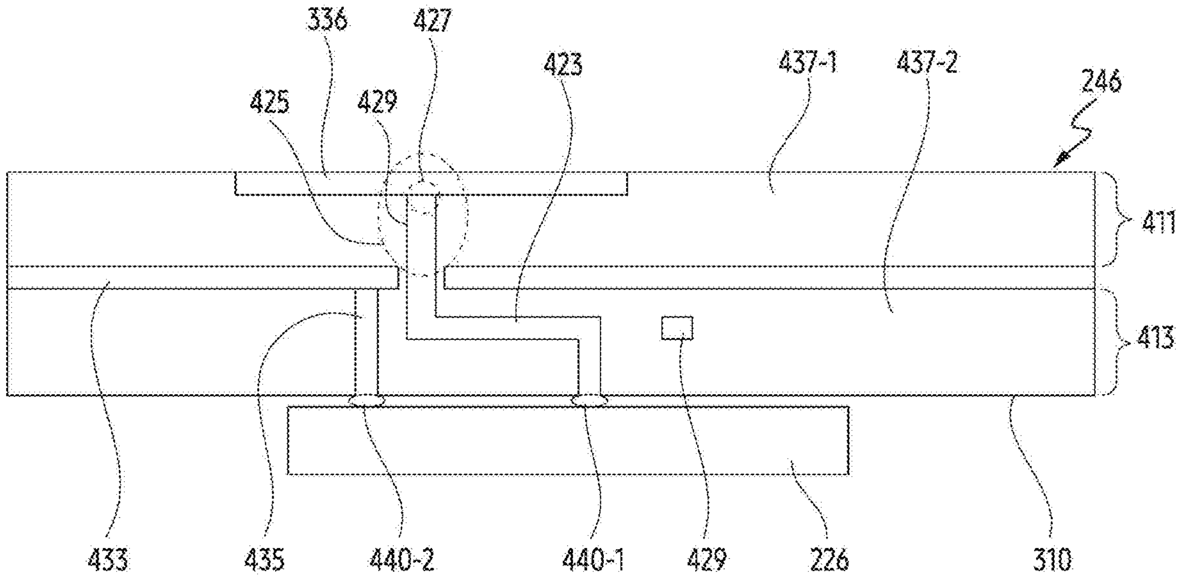
FIG. 4 is a diagram illustrating a cross-sectional view taken along line B-B' of a third antenna module of FIG. 3 according to an embodiment of the disclosure.

FIG. 4 illustrates a cross-section taken along line B-B' of the third antenna module 246 of 300*a* of FIG. 3 according to an embodiment of the disclosure.

A printed circuit board 310 of the illustrated embodiment may include an antenna layer 411 and a network layer 413.

The antenna layer 411 may include at least one dielectric layer 437-1, and an antenna element 336 and/or a feeding unit 425 formed on the outer surface of or inside of the dielectric layer. The feeding unit 425 may include a feeding point 427 and/or a feeding line 429.

The network layer 413 may include at least one dielectric layer 437-2, at least one ground layer 433 formed on the outer surface of or inside of the dielectric layer, at least one conductive via 435, and/or a transmission line 423.

In addition, in the illustrated embodiment of the disclosure, the third RFIC 226 may be electrically connected to the network layer 413, for example, through first and second connecting portions (solder bumps) 440-1 and 440-2. In other embodiments of the disclosure, various connecting structures (e.g., solder or ball grid array (BGA)) may be used instead of the connecting portions. The third RFIC 226 may be electrically connected to the antenna element 336 via a first connecting portion 440-1, the transmission line 423, and the feeding unit 425. The third RFIC 226 may also be electrically connected to the ground layer 433 via the second connecting portion 440-2 and the conductive via 435.

Figure 5:
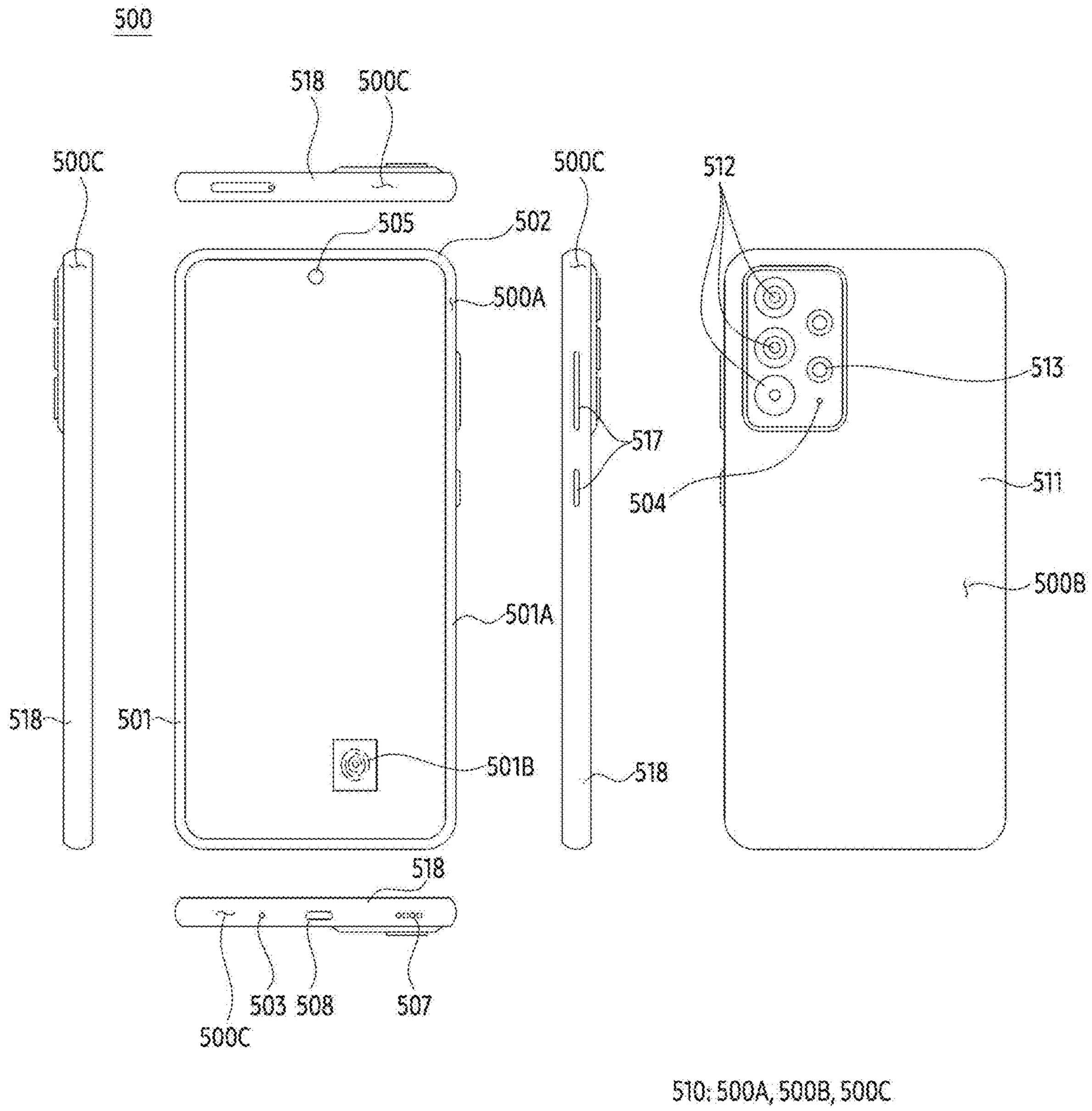
FIG. 5 is a diagram illustrating an electronic device according to an embodiment of the disclosure.

FIG. 5 is a diagram illustrating an electronic device according to an embodiment of the disclosure.

Referring to FIG. 5, an electronic device 500 according to an embodiment of the disclosure may include a housing 510 forming an exterior of the electronic device 500. For example, the housing 510 may include a first surface (or front surface) 500A, a second surface (or rear surface) 500B, and a third surface (or side) 500C surrounding a space between the first surface 500A and the second surface 500B. In an embodiment of the disclosure, the housing 510 may refer to a structure (e.g., a frame structure 540 of FIG. 6) forming at least a portion of the first surface 500A, the second surface 500B, and/or the third surface 500C.

The electronic device 500 according to an embodiment of the disclosure may include a substantially transparent front plate 502. In an embodiment of the disclosure, the front plate 502 may form at least a portion of the first surface 500A. In and embodiment of the disclosure, the front plate 502 may, for example, include, although not limited to, a glass plate or a polymer plate including various coating layers.

The electronic device 500 according to an embodiment may include a substantially opaque rear plate 511. In an embodiment of the disclosure, the rear plate 511 may form at least a portion of the second surface 500B. In one embodiment of the disclosure, the rear plate 511 may be formed of coated or colored glass, ceramic, polymer, metal (e.g., aluminum, stainless steel (STS), or magnesium), or a combination of at least two of the materials.

Figure 6:
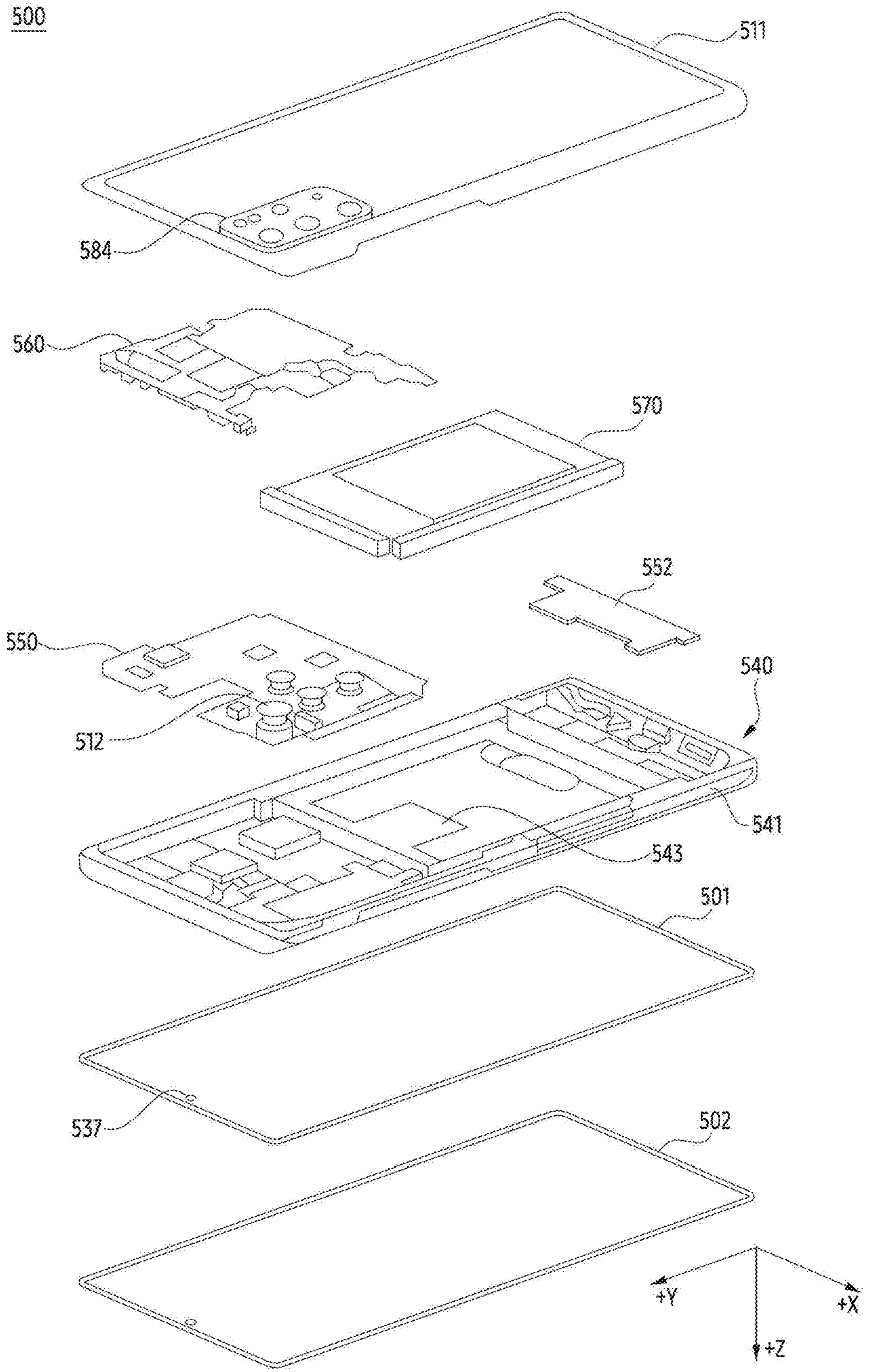
FIG. 6 is an exploded perspective view of an electronic device according to an embodiment of the disclosure.

The electronic device 500 according to an embodiment of the disclosure may include a side bezel structure (or a peripheral part) 518 (e.g., a sidewall 541 of a frame structure 540 of FIG. 6). In an embodiment of the disclosure, the side bezel structure 518 may be coupled to the front plate 502 and/or the rear plate 511 to form at least a portion of the third surface 500C of the electronic device 500. For example, the side bezel structure 518 may form all of the third surface 500C of the electronic device 500, and for another example, the side bezel structure 518 may form a third surface 500C of the electronic device 500 together with the front plate 502 and/or the rear plate 511.

As opposed to the illustrated embodiment of the disclosure, when the third surface 500C of the electronic device 500 is partially formed by the front plate 502 and/or the rear plate 511, the front plate 502 and/or the rear plate 511 may include a region extending seamlessly from its edge toward the rear plate 511 and/or the front plate 502. The extending region of the front plate 502 and/or the rear plate 511 may be, for example, located at both ends of a long edge of the electronic device 500, but it is not limited to the above-described example.

In one embodiment of the disclosure, the side bezel structure 518 may include a metal and/or a polymer. In an embodiment of the disclosure, the rear plate 511 and the side bezel structure 518 may be integrally formed and may include the same material (e.g., a metal material, such as aluminum), but the disclosure are not limited thereto. For example, the rear plate 511 and the side bezel structure 518 may be formed in separate configurations and/or may include different materials.

In an embodiment of the disclosure, the electronic device 500 may include at least one of a display 501, audio modules 503, 504 and 507, a sensor module (not shown), camera modules 505, 512 and 513, a key input device 517, a light emitting device (not shown), and/or a connector hole 508. In another embodiment of the disclosure, the electronic device 500 may omit at least one of those components (e.g., the key input device 517 or the light emitting device) or may additionally include another component.

In an embodiment of the disclosure, the display 501 (e.g., the display module 160 of FIG. 1) may be visually exposed through a corresponding portion of the front plate 502. For example, At least a portion of the display 501 may be visible through the front plate 502 forming the first surface 500A. In an embodiment of the disclosure, the display 501 may be disposed on a back side of the front plate 502.

In an embodiment of the disclosure, an outer shape of the display 501 may be formed to be substantially the same as the outer shape of the front plate 502 adjacent to the display 501. In an embodiment of the disclosure, in order to expand an area in which the display 501 is visually exposed, a spacing distance between a periphery of the display 501 and a periphery of the front plate 502 may be generally the same.

In an embodiment of the disclosure, the display 501 (or the first surface 500A of the electronic device 500) may include a screen display area 501A. In an embodiment of the disclosure, the display 501 may provide visual information to a user on the screen display area 501A. In the embodiment illustrated, it is shown that the screen display area 501A is spaced apart from an outer periphery of the first surface 500A and is located inside the first surface 500A, when looking directly at the first surface 500A, but the disclosure is not limited thereto. In another embodiment of the disclosure, when looking directly at the first surface 500A, at least a portion of the periphery of the screen display area 501A may substantially match the periphery of the first surface 500A (or the front plate 502).

In an embodiment of the disclosure, the screen display area 501A may include a sensing area 501B configured to obtain biometric information of the user. Here, the meaning of the phrase "the screen display area 501A may include a sensing area 501B" may be understood as at least a portion of the sensing area 501B overlapping the screen display area 501A. For example, like other areas of the screen display area 501A, the sensing area 501B may refer to an area capable of displaying visual information by the display 501 and additionally obtaining biometric information (e.g., a fingerprint) of the user. In another embodiment of the disclosure, the sensing area 501B may be formed in the key input device 517.

In an embodiment of the disclosure, the display 501 may include an area where a first camera module 505 (e.g., the camera module 180 of FIG. 1) is located. In an embodiment of the disclosure, an opening may be formed in the area of the display 501, and the first camera module 505 (e.g., a punch hole camera) may be at least partially disposed in the opening to face the first surface 500A. In such a case, the screen display area 501A may surround at least a portion of an edge of the opening. In another embodiment of the disclosure, the first camera module 505 (e.g., an under display camera (UDC)) may be disposed underneath the display 501 to overlap the area of the display 501. In this case, the display 501 may provide visual information to the user through the area, and additionally the first camera module 505 may obtain an image corresponding to a direction toward the first surface 500A through the area of the display 501.

In an embodiment of the disclosure, the display 501 may be coupled with or disposed adjacent to a touch sensing circuit, a pressure sensor capable of measuring intensity (pressure) of a touch, and/or a digitizer for detecting a magnetic field type of stylus pen.

In an embodiment of the disclosure, the audio modules 503, 504, and 507 (e.g., the audio module 170 of FIG. 1) may include microphone holes 503 and 504 and speaker holes 507.

In an embodiment of the disclosure, the microphone holes 503 and 504 may include a first microphone hole 503 formed in a partial area of the third surface 500C and a second microphone hole 504 formed in a partial area of the second surface 500B. A microphone (not shown) for obtaining an external sound may be disposed inside the microphone holes 503 and 504. The microphone may include a plurality of microphones to detect a direction of the sound.

In an embodiment of the disclosure, the second microphone hole 504 formed in a partial area of the second surface 500B may be disposed adjacent to the camera modules 505, 512, and 513. For example, the second microphone hole 504 may acquire sound according to operations of the camera modules 505, 512, and 513. However, the disclosure is not limited thereto.

In an embodiment of the disclosure, a speaker hole 507 may include an external speaker hole 507 and a call receiver hole (not shown). The external speaker hole 507 may be formed in a portion of the third surface 500C of the electronic device 500. In another embodiment of the disclosure, the external speaker hole 507 may be implemented as one hole with the microphone hole 503. Although not shown herein, the call receiver hole (not shown) may be formed in another portion of the third surface 500C. For example, the call receiver hole may be formed on the third surface 500C opposite to the external speaker hole 507. For example, with reference to the illustration of FIG. 5, the external speaker hole 507 may be formed on the third surface 500C corresponding to the lower end of the electronic device 500, and the receiver hole for calling may be formed on the third surface 500C corresponding to the upper end of the electronic device 500. However, the disclosure is not limited thereto, and in another embodiment of the disclosure, the call receiver hole may be arranged at a position other than the third surface 500C. For example, the call receiver hole may be formed by a space spaced apart between the front plate 502 (or the display 501) and the side bezel structure 518.

In an embodiment of the disclosure, the electronic device 500 may include at least one speaker (not shown) configured to output sound to the outside of the housing 510 through the external speaker hole 507 and/or the call receiver hole (not shown).

In an embodiment of the disclosure, the sensor module (not shown) (e.g., the sensor module 176 of FIG. 1) may generate an electrical signal or a data value corresponding to an internal operating state of the electronic device 500 or an external environmental condition. For example, the sensor module may include at least one of a proximity sensor, a heart rate monitor (HRM) sensor, a fingerprint sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

In an embodiment of the disclosure, the camera modules 505, 512, and 513 (e.g., the camera module 180 of FIG. 1) may include a first camera module 505 disposed to face the first surface 500A of the electronic device 500, a second camera module 512 disposed to face the second surface 500B, and a flash 513.

In an embodiment of the disclosure, the second camera module 512 may include a plurality of cameras (e.g., a dual camera, a triple camera, or a quad camera). However, the second camera module 512 is not necessarily limited to including a plurality of cameras, and may include a single camera.

In an embodiment of the disclosure, the first camera module 505 and the second camera module 512 may include one or more lenses, an image sensor, and/or an image signal processor.

In an embodiment of the disclosure, the flash 513 may include, for example, a light emitting diode or a xenon lamp. In another embodiment of the disclosure, two or more lenses (infrared camera lens, or wide-angle and telephoto lenses) and image sensors may be disposed on one surface of the electronic device 500.

In an embodiment of the disclosure, the key input device 517 (e.g., the input module 150 of FIG. 1) may be disposed on the third surface 500C of the electronic device 500. In another embodiment of the disclosure, the electronic device 500 may not include some or all of the key input devices 517, and the key input devices 517 that are not included therein may be implemented in another form, such as a soft key on the display 501.

In an embodiment of the disclosure, the connector hole 508 may be formed on the third surface 500C of the electronic device 500 so as to accommodate a connector of an external device. A connecting terminal (e.g., the connecting terminal 178 of FIG. 1) electrically connected to the connector of the external device may be disposed in the connector hole 508. The electronic device 500 according to an embodiment may include an interface module (e.g., the interface 177 of FIG. 1) for processing electrical signals transmitted/received through the connection terminal.

In an embodiment of the disclosure, the electronic device 500 may include a light emitting device (not shown). For example, the light emitting device (not shown) may be disposed on the first surface 500A of the housing 510. The light emitting device (not shown) may provide state information of the electronic device 500 in the form of light. In another embodiment of the disclosure, the light emitting device (not shown) may provide a light source in association with the operation of the first camera module 505. For example, the light emitting device (not shown) may include an LED, an IR LED, and/or a xenon lamp.

FIG. 6 is an exploded perspective view of an electronic device according to an embodiment of the disclosure.

Hereinafter, a description of a configuration having the same reference numerals as those of the above-described configuration will be omitted.

Referring to FIG. 6, the electronic device 500 according to an embodiment of the disclosure may include a frame structure 540, a first printed circuit board 550, a second printed circuit board 552, a cover plate 560, and a battery 570.

In an embodiment of the disclosure, the frame structure 540 may include a sidewall 541 forming an outer appearance (e.g., the third surface 500C of FIG. 5) of the electronic device 500 and a support portion 543 extending inward from the sidewall 541. In an embodiment of the disclosure, the frame structure 540 may be disposed between the display 501 and the rear plate 511. In an embodiment of the disclosure, the sidewall 541 of the frame structure 540 may surround a space between the rear plate 511 and the front plate 502 (and/or the display 501), and the support portion 543 of the frame structure 540 may extend from the sidewall 541 in the space.

In an embodiment of the disclosure, the frame structure 540 may support or accommodate other components included in the electronic device 500. For example, the display 501 may be disposed on one surface of the frame structure 540 facing one direction (e.g., +z direction), and the display 501 may be supported by the support portion 543 of the frame structure 540. As another example, the first printed circuit board 550, the second printed circuit board 552, the battery 570, and the second camera module 512 may be disposed on the other surface of the frame structure 540 facing a direction (e.g., −z direction) opposite to the one direction. The first printed circuit board 550, the second printed circuit board 552, the battery 570, and the second camera module 512 may be seated in recesses formed on the sidewall 541 and/or the support portion 543 of the frame structure 540, respectively.

In an embodiment of the disclosure, the first printed circuit board 550, the second printed circuit board 552, and the battery 570 may be disposed in the frame structure 540. For example, the first printed circuit board 550 and the second printed circuit board 552 may be fixedly disposed in the frame structure 540 by means of a coupling member, such as a screw. For example, the battery 570 may be fixedly disposed in the frame structure 540 by means of an adhesive member (e.g., a double-sided tape). However, the disclosure is not limited to the above-described example.

In an embodiment of the disclosure, the cover plate 560 may be disposed between the first printed circuit board 550 and the rear plate 511. In an embodiment of the disclosure, the cover plate 560 may be disposed on the first printed circuit board 550. For example, the cover plate 560 may be disposed on a surface of the first printed circuit board 550 facing the −z direction.

In an embodiment of the disclosure, the cover plate 560 may at least partially overlap the first printed circuit board 550 with respect to the z-axis. In an embodiment of the disclosure, the cover plate 560 may cover at least a partial area of the first printed circuit board 550. Accordingly, the cover plate 560 may protect the first printed circuit board 550 from a physical impact or prevent a connector coupled to the first printed circuit board 550 from being separated.

In an embodiment of the disclosure, the cover plate 560 may be fixedly disposed on the first printed circuit board 550 by means of a coupling member (e.g., a screw), or may be coupled to the frame structure 540 together with the first printed circuit board 550 by means of the coupling member.

In an embodiment of the disclosure, the display 501 may be disposed between the frame structure 540 and the front plate 502. For example, the front plate 502 may be disposed on one side (e.g., the +z direction) of the display 501, and the frame structure 540 may be disposed on the other side (e.g., the −z direction).

In an embodiment of the disclosure, the front plate 502 may be coupled to the display 501. For example, the front plate 502 and the display 501 may be bonded to each other through an optically adhesive member (e.g., optically clear adhesive (OCA) or optically clear resin (OCR)) interposed therebetween.

In an embodiment of the disclosure, the front plate 502 may be coupled to the frame structure 540. For example, the front plate 502 may include an outer periphery extending out of the display 501 when viewed in the z-axis direction, and may be bonded to the frame structure 540 by means of an adhesive member (e.g., a double-sided tape) disposed between the outer periphery of the front plate 502 and the frame structure 540 (e.g., the sidewall 541). However, it is not limited by the above-described example.

In an embodiment of the disclosure, a processor (e.g., the processor 120 of FIG. 1), memory (e.g., the memory 130 of FIG. 1), and/or an interface (e.g., the interface 177 of FIG. 1) may be mounted on the first printed circuit board 550 and/or the second printed circuit board 552. The processor may include, for example, one or more of a central processing unit, an application processor, a graphic processing unit, an image signal processor, a sensor hub processor, or a communication processor. The memory may include, for example, volatile memory or non-volatile memory. The interface may include, for example, a high definition multimedia interface (HDMI), a universal serial bus (USB) interface, an SD card interface, and/or an audio interface. The interface may electrically or physically connect the electronic device 500 to an external electronic device and may include a USB connector, an SD card/multimedia card (MMC) connector, or an audio connector. In an embodiment of the disclosure, the first printed circuit board 550 and the second printed circuit board 552 may be operatively or electrically connected to each other via a connection member (e.g., a flexible printed circuit board).

In an embodiment of the disclosure, the battery 570 (e.g., the battery 189 of FIG. 1) may supply power to at least one component of the electronic device 500. For example, the battery 570 may include a rechargeable secondary battery or a fuel cell. At least a portion of the battery 570 may be disposed on substantially the same plane as the first printed circuit board 550 and/or the second printed circuit board 552.

The electronic device 500 according to an embodiment of the disclosure may include an antenna module (not shown) (e.g., the antenna module 197 of FIG. 1). In an embodiment of the disclosure, the antenna module may be disposed between the rear plate 511 and the battery 570. The antenna module may include, for example, a near field communication (NFC) antenna, a wireless charging antenna, and/or a magnetic secure transmission (MST) antenna. The antenna module may, for example, perform short-range communication with an external device or wirelessly transmit and receive power to and from the external device.

In an embodiment of the disclosure, the first camera module 505 (e.g., a front camera) may be disposed in at least a portion (e.g., the support portion 543) of the frame structure 540 such that its lens can receive external light through a partial area (e.g., a camera area 537) of the front plate 502 (e.g., the front 500A of FIG. 5).

In an embodiment of the disclosure, the second camera module 512 (e.g., a rear camera) may be disposed between the frame structure 540 and the rear plate 511. In an embodiment of the disclosure, the second camera module 512 may be electrically connected to the first printed circuit board 550 through a connection member (e.g., a connector). In an embodiment of the disclosure, the second camera module 512 may be disposed such that its lens can receive external light through a camera area 584 of the rear plate 511 of the electronic device 500.

In an embodiment of the disclosure, the camera area 584 may be formed on a surface (e.g., the second surface 500B of FIG. 5) of the rear plate 511. In an embodiment of the disclosure, the camera area 584 may be formed to be at least partially transparent so that external light may be incident on the lens of the second camera module 512. In an embodiment of the disclosure, at least a portion of the camera area 584 may protrude from the surface of the rear plate 511 to a predetermined height. However, the disclosure is not limited thereto, and in another embodiment of the disclosure, the camera area 584 may form substantially the same plane as the surface of the rear plate 511.

In an embodiment of the disclosure, a housing of the electronic device 500 may refer to a configuration or structure that forms at least a portion of an exterior of the electronic device 500. In this context, at least some of the front plate 502, the frame structure 540, and/or the rear plate 511 forming the exterior of the electronic device 500 may be referred to as the housing of the electronic device 500.

Figure 7:
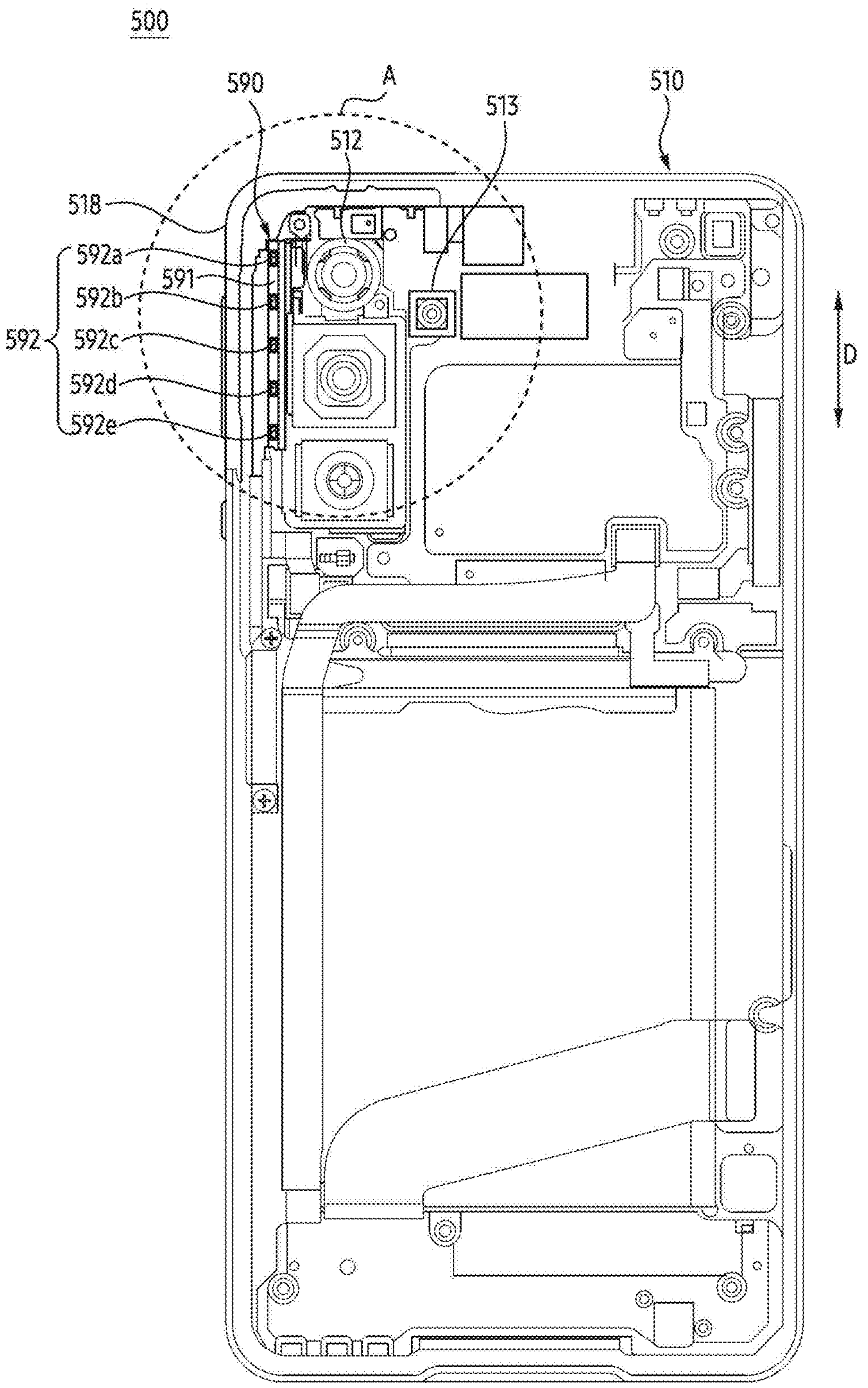
FIG. 7 is a rear view of an electronic device in which a rear plate thereof is omitted, according to an embodiment of the disclosure.

FIG. 7 is a rear view of an electronic device in which its rear plate is omitted, according to an embodiment of the disclosure.

Referring to FIG. 7, an electronic device 500 according to an embodiment may include a housing 510 forming an outer appearance thereof and an antenna module 590 disposed inside the housing 510.

According to an embodiment of the disclosure, the housing 510 may include a first surface (e.g., the first surface 500A of FIG. 5) on which a display (e.g., the display 501 of FIG. 5) is disposed, a second surface 500B (e.g., the second surface 500B of FIG. 5) opposite to the first surface 500A, and a peripheral part (e.g., the side bezel structure 518 of FIG. 5) surrounding a space between the first surface 500A and the second surface 500B. According to an embodiment of the disclosure, the first surface 500A, the second surface 500B, and the peripheral part 518 may form an inner space in which various electronic components may be disposed.

According to an embodiment of the disclosure, the antenna module 590 may be disposed inside the housing 510. The antenna module 590 may be disposed in a direction D parallel to one side of the peripheral part 518 and may include a substrate 591 and a plurality of antenna elements 592 spaced apart from each other in the direction D on one surface of the substrate 591.

According to an embodiment of the disclosure, the antenna module 590 may be disposed adjacent to the peripheral part 518 to transmit and/or receive a wireless communication signal through at least a portion of the peripheral part 518. In an embodiment of the disclosure, the antenna module 590 may be disposed close to the peripheral part 518 of the housing 510. For example, the antenna module 590 may be disposed between the peripheral part 518 and the camera module 512, but is not limited thereto.

According to an embodiment of the disclosure, the antenna module 590 (e.g., the third antenna module 246 of FIG. 2) may transmit a signal to the outside of the electronic device 500 or may receive a signal from the outside of the electronic device 500. The antenna module 590 may be configured to communicate with an external electronic device (e.g., the external electronic device 102 of FIG. 1) with signals in a specified first frequency band (e.g., about 3 GHz to about 60 GHz). For example, the specified band may be a band corresponding to a 5G network defined in 3GPP.

According to an embodiment of the disclosure, the plurality of antenna elements 592 may be spaced apart from each other by a certain interval in one direction (e.g., the direction D) on the substrate 591 on one surface of the substrate 591 or adjacent to one surface of the substrate 591. For example, the antenna module 590 may include a first antenna element **592*a*, a second antenna element 592*b* spaced apart from the first antenna element 592*a* in the direction D, a third antenna element 592*c* spaced apart from the second antenna element 592*b* in the direction D, a fourth antenna element 592*d* spaced apart from the third antenna element 592*c* in the direction D, and/or a fifth antenna element 592*e* spaced apart from the fourth antenna element 592*d* in the direction D. For example, the first antenna element 592*a* to the fifth antenna element 592*e*** may be substantially the same or different type of radiators.

According to an embodiment of the disclosure, the plurality of antenna elements 592 may operate as a patch antenna. For example, the plurality of antenna elements 592 may be patch antennas formed of a thin metal patch plate on the substrate 591, but are not limited thereto. The plurality of antenna elements 592 may form wireless communication signals in the form of electromagnetic waves. For example, the antenna module 590 may form a directional beam using the plurality of antenna elements 592.

Figure 8A:
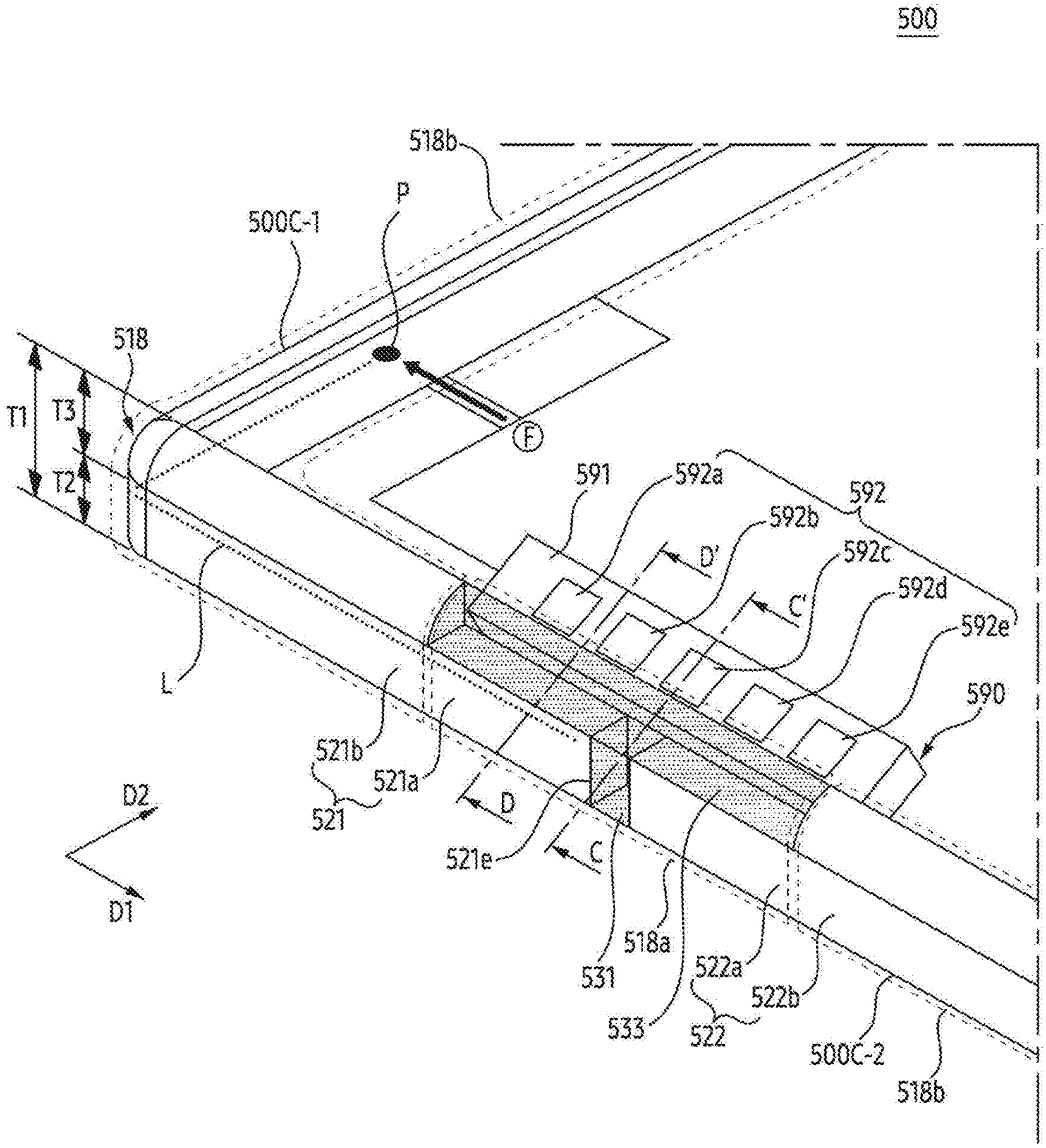
FIG. 8A shows an enlarged example of part A of FIG. 7 according to an embodiment of the disclosure.

FIG. 8A shows an enlarged example of a part A of FIG. 7 according to an embodiment of the disclosure.

Figure 8B:
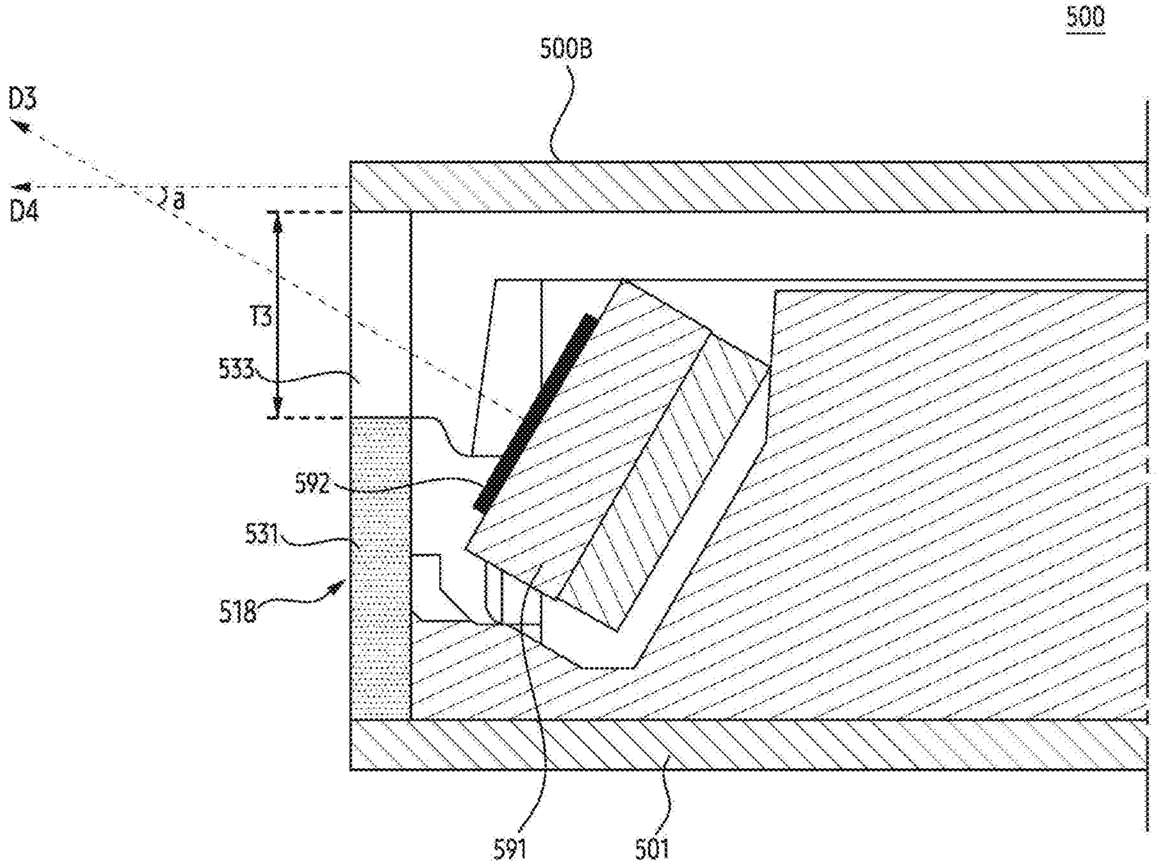
FIG. 8B is a cross-sectional view taken along line C-C' of an electronic device of FIG. 8A according to an embodiment of the disclosure.

FIG. 8B is a cross-sectional view taken along line C-C' of an electronic device of FIG. 8A according to an embodiment of the disclosure.

Figure 8C:
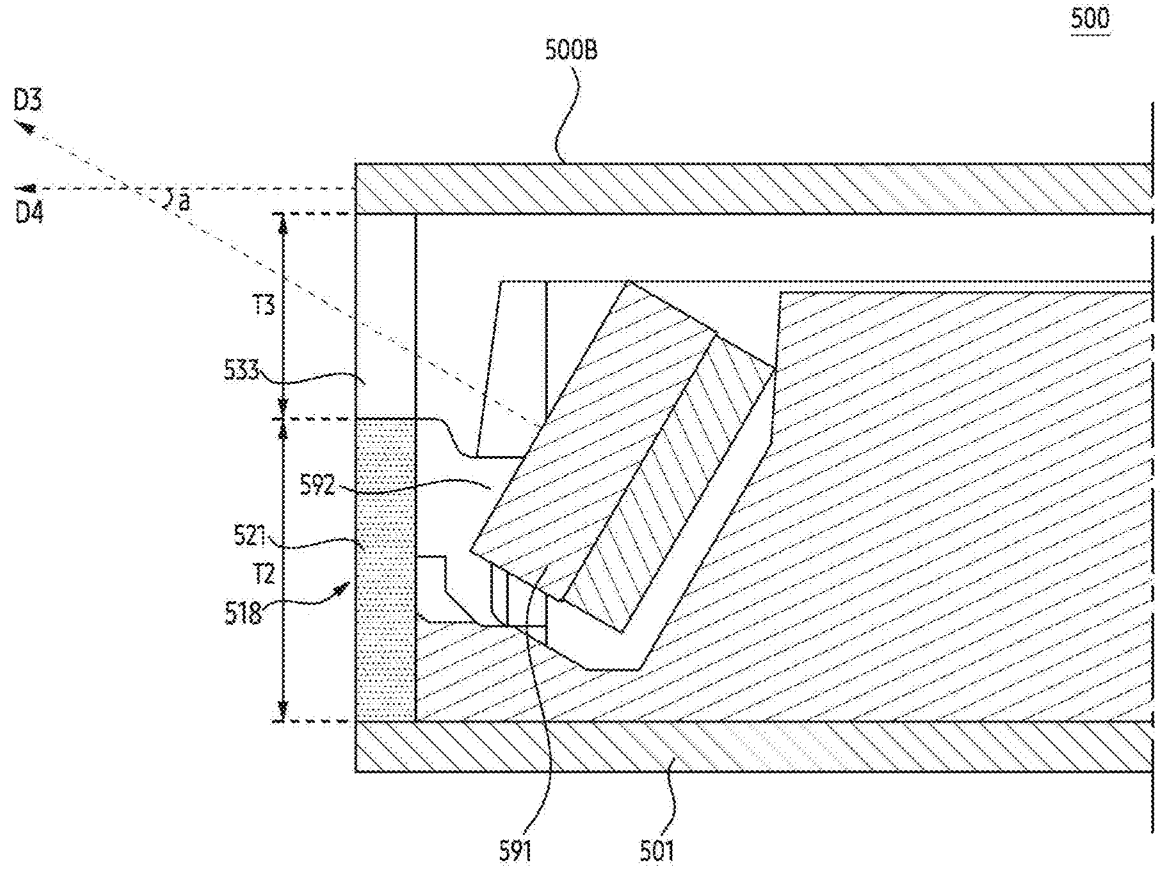
FIG. 8C is a cross-sectional view taken along line D-D' of an electronic device of FIG. 8A according to an embodiment of the disclosure.

FIG. 8C is a cross-sectional view taken along line D-D' of an electronic device of FIG. 8A according to an embodiment of the disclosure.

Figure 8D:
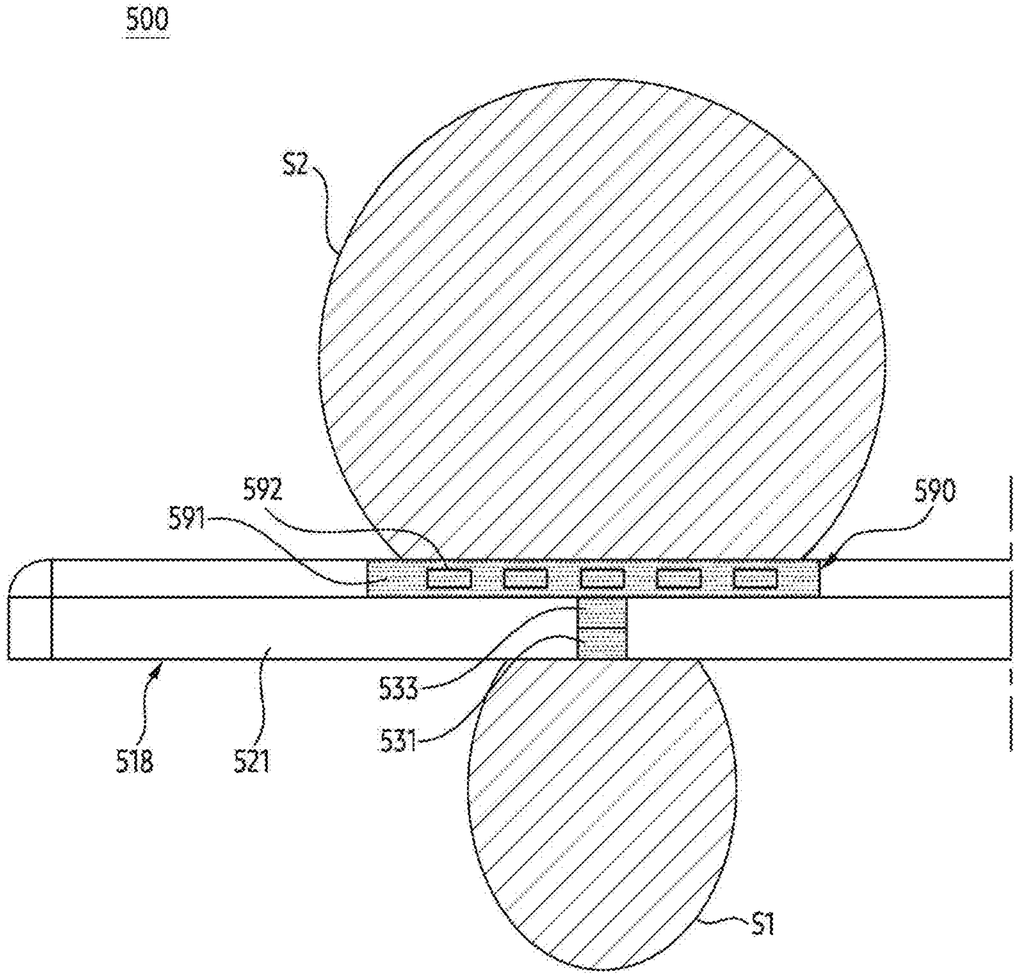
FIG. 8D is a schematic side view of a peripheral part of an electronic device shown in FIG. 8A as viewed vertically according to an embodiment of the disclosure.

FIG. 8D is a schematic side view of a peripheral part of an electronic device shown in FIG. 8A as viewed vertically according to an embodiment of the disclosure.

Referring to FIG. 8A, the peripheral part 518 may include conductive portions 521 and 522, and a first non-conductive portion 531 in contact with end portions of the conductive portions 521 and 522. According to an embodiment of the disclosure, the peripheral part 518 may include a first side 500C-1 and a second side 500C-2 perpendicular to the first side 500C-1. For example, the first side 500C-1 may extend in a direction D2 perpendicular to the direction D1, and the second side 500C-2 may extend in a direction parallel to the direction D1.

According to an embodiment of the disclosure, the conductive portions 521 and 522 may include a first conductive portion 521 and a second conductive portion 522 spaced apart from each other by the first non-conductive portion 531. The first conductive portion 521 may be disposed on a portion of the first side 500C-1 and/or a portion of the second side 500C-2. The second conductive portion 522 may be spaced apart from an end portion 521*e* of the first conductive portion 521. The first non-conductive portion 531 may be disposed between the first conductive portion 521 and the second conductive portion 522. The second side 500C-2 may form a segmented structure by the first conductive portion 521 and the second conductive portion 522 spaced apart from each other with the first non-conductive portion 531 interposed therebetween.

According to an embodiment of the disclosure, the first non-conductive portion 531 may pass electromagnetic waves radiating from the plurality of antenna elements 592. The first non-conductive portion 531 may include a non-conductive material capable of transmitting electromagnetic waves radiating from the plurality of antenna elements 592. For example, the first non-conductive portion 531 may include, although not limited thereto, a ceramic material or a polymer.

According to an embodiment of the disclosure, when the peripheral part 518 is viewed vertically (e.g., when the peripheral part 518 is viewed in the direction D2), the peripheral part 518 may include a first region 518*a* overlapping the antenna module 590, and a second region 518*b* in which the conductive portions (e.g., a second portion 521*b* of the first conductive portion 521 and a fourth portion 522*b* of the second conductive portion 522) are disposed, the conductive portions having a thickness T1 greater than a thickness T2 of the other conductive portions (e.g., a first portion 521*a* of the first conductive portion 521 and a third portion 522*a* of the second conductive portion 522) disposed in the first region 518*a*. The first region 518*a*, which is a region facing the antenna module 590 adjacent to the peripheral part 518, may have a length substantially corresponding to the length of the antenna module 590. The second region 518*b* may be a remaining partial area other than the first region 518*a*. The thickness T2 of the portion (e.g., the second portion 521*b*) included in the second region 518*b* may be greater than the thickness T1 of the portion (e.g., the first portion 521*a*) included in the first region 518*a*. For example, the thickness T2 of the first conductive portion 521 in the second region 518*b* may be about 2 mm to about 4 mm thicker than the thickness T1 of the first conductive portion 521 in the first region 518*a*, but the disclosure is not limited thereto. According to an embodiment of the disclosure, a difference between the thickness T1 of the conductive portions 521*a* and 522*a* in the first region 518*a* and the thickness T2 of the conductive portions 521*b* and 522*b* in the second region 518*b* may be formed to have a thickness T3 of a notch 533 through which electromagnetic waves radiating from the antenna elements 592 can pass. The notch 533 formed by the difference between the thickness T2 of the conductive portions 521*b* and 522*b* in the second region 518*b* and the thickness T1 of the conductive portions 521*a* and 522*a* in the first region 518*a* may be formed as an empty space or may be filled with a non-conductive material. According to an embodiment of the disclosure, the first non-conductive portion 531 may be disposed on the conductive portions 521*a* and 522*a* of the first region 518*a*.

According to an embodiment of the disclosure, when the second side 500C-2 is viewed vertically (e.g., when the second side 500C-2 is viewed in the direction D2), the first conductive portion 521 may include a first portion 521*a* overlapping the antenna module 590 and a second portion 521*b* thicker than the first portion 521*a*. For example, the first portion 521*a* may be positioned on the second side 500C-2, and the second portion 521*b* may be positioned on the second side 500C-2 and the first side 500C-1. When the second side 500C-2 is viewed vertically, the second conductive portion 522 may include a third portion 522*a* overlapping the antenna module 590 and a fourth portion 522*b* thicker than the third portion 522*a*. The first portion 521*a* and the third portion 522*a* may be positioned in the first region 518*a*, and the second portion 521*b* and the fourth portion 522*d* may be positioned in the second region 518*b*.

According to an embodiment of the disclosure, when the peripheral part 518 is viewed vertically, the first non-conductive portion 531 may overlap one of the plurality of antenna elements 592 in the first region 518*a*. For example, when the peripheral part 518 is viewed vertically, the first non-conductive portion 531 may overlap the third antenna element 592*c* among the first antenna element 592*a* to the fifth antenna element 592*e* disposed on the substrate 591, but the disclosure is not limited thereto. When the antenna module 590 receives and/or transmits a wireless communication signal, the wireless communication signal, which is an electromagnetic signal, may electromagnetically interact with the conductive portions 521 and 522 of the peripheral part 518. The performance (e.g., sensitivity) of the antenna module 590 may be reduced due to an interaction between the wireless communication signal and the conductive portions 521 and 522. For example, the wireless communication signal, which is an electromagnetic wave to be transmitted or received by the antenna module 590, may be distorted or reflected by an interaction with the first conductive portion 521 including a metal.

According to an embodiment of the disclosure, the first non-conductive portion 531 overlaps one of the plurality of antenna elements 592, and thus electromagnetic waves radiating from the antenna module 590 may be transmitted to the outside of the electronic device 500 via the first non-conductive portion 531. For example, the first non-conductive portion 531 may be positioned on a transmission path of the wireless communication signal radiating from an antenna element (e.g., the third antenna element 592*c*) overlapping the first non-conductive portion 531 toward the second side 500C-2. Electromagnetic waves including the wireless communication signal radiating from an antenna element (e.g., the third antenna element 592*c*) overlapping the first non-conductive portion 531 toward the second side 500C-2 may be transmitted to the outside of the electronic device 500 through the first non-conductive portion 531 disposed between the first conductive portion 521 and the second conductive portion 522. Some of the electromagnetic waves including the wireless communication signal radiating from the remaining antenna elements (e.g., the first antenna element 592*a*, the second antenna element 592*b*, the fourth antenna element 592*d*, or the fifth antenna element 592*e*) other than the antenna element (e.g., the third antenna element 592*c*) overlapping the first non-conductive portion 531 among the plurality of antenna elements 592 may be transmitted to the outside of the electronic device 500 via the first non-conductive portion 531. The remaining portion of the electromagnetic wave including the wireless communication signal radiating from the first antenna element 592*a*, the second antenna element 592*b*, the fourth antenna element 592*d*, and/or the fifth antenna element 592*e* may be reflected by the conductive portions 521 and 522. An intensity of electromagnetic waves passing through the first region 518*a* from the third antenna element 592*c* may be greater than the intensity of electromagnetic waves passing through the first region 518*a* from the remaining antenna elements 592*a*, 592*b*, 592*d*, and 592*e*.

According to an embodiment of the disclosure, since the first non-conductive portion 531 has a relatively slight influence on a wireless communication signal radiating from the plurality of antenna elements 592, the performance of the antenna module 590 may be improved. For example, when the substrate 591 on which the antenna elements 592 are disposed faces the second side 500C-2, the electromagnetic waves radiating from the plurality of antenna elements 592 may substantially face the second side 500C-2. As the first non-conductive portion 531 is disposed on the transmission path of the electromagnetic wave, the electromagnetic wave including the signal may be transmitted through the second side 500C-2.

According to an embodiment of the disclosure, at least a portion of the first conductive portion 521 may be fed with power from wireless communication circuitry (e.g., the wireless communication module 192 of FIG. 1) to operate as an antenna for transmitting and/or receiving a wireless communication signal in a specified band. For example, when power is fed from a feeding portion F to a feeding point P of the first conductive portion 521, a transmission path L of the electrical signal may be formed from the feeding point P of the first conductive portion 521 to the end portion 521*e* of the first conductive portion 521. With the path L of the electrical signal, the first conductive portion 521 may operate as an antenna capable of transmitting and/or receiving a wireless communication signal in a specified band.

According to an embodiment of the disclosure, a resonant frequency of the antenna formed by the first conductive portion 521 may be set based on a length of the path L of the electrical signal. For example, as the length of the path L of the electrical signal increases, the resonant frequency of the antenna may be set in a relatively low frequency band, while as the length of the path L of the electrical signal decreases, the resonant frequency of the antenna may be set in a relatively high frequency band.

According to an embodiment of the disclosure, the antenna formed by the first conductive portion 521 may be distinguished from the antenna module 590. According to an embodiment of the disclosure, the wireless communication circuitry 190 may be electrically connected to the antenna module 590 and the first conductive portion 521. The wireless communication circuitry 190 may be configured to communicate with an external electronic device through a signal in a first frequency band through the antenna module 590. The wireless communication circuitry 190 may be configured to communicate with an external electronic device through a signal in a second frequency band different from the first frequency band through the first conductive portion 521.

According to an embodiment of the disclosure, the second frequency band may be lower than the first frequency band in frequency. The antenna formed by the first conductive portion 521 may be configured to perform wireless communication with, for example, a legacy network including the second generation (2G), third generation (3G), fourth generation (4G), and/or long term evolution (LTE) networks. The antenna module 590 may be configured to perform wireless communication with the 5G network defined in 3GPP. For example, the antenna formed by the first conductive portion 521 may transmit and/or receive a wireless communication signal in the first frequency band of about 1 GHz or less, and the antenna module 590 may transmit and/or receive a wireless communication signal in the second frequency band of about 6 GHz or more.

According to an embodiment of the disclosure, a length of the first conductive portion 521 may be determined based on a position of the first non-conductive portion 531. The first conductive portion 521 may extend to one of regions in which the plurality of antenna elements 592 of the substrate 591 are spaced apart from each other. For example, the first non-conductive portion 531 may be disposed in a position overlapping the third antenna element 592*c* in the first region 518*a*, when the peripheral part 518 is viewed vertically. In an embodiment of the disclosure, when the first non-conductive portion 531 is disposed in a position overlapping the third antenna element 592*c* in the first region 518*a*, the first conductive portion 521 may extend to a region between the second antenna element 592*b* and the third antenna element 592*c*.

According to an embodiment of the disclosure, the path L of the electrical signal formed in the first conductive portion 521 may be determined based on the length of the first conductive portion 521. When power is fed to the feeding point P located on the first side 500C-1 of the first conductive portion 521, the path L of the electrical signal may be formed from the feeding point P to the end portion 521*e* of the first conductive portion 521 in contact with the first non-conductive portion 531. In order for an antenna formed by the first conductive portion 521 to transmit and/or receive a wireless communication signal in the second frequency band lower than the first frequency band in frequency, the length of the first conductive portion 521 greater than or equal to a certain length may be required. According to an embodiment of the disclosure, the first conductive portion 521 may be formed up to a position overlapping the antenna module 590, and therefore the first conductive portion 521 may have a length capable of transmitting and/or receiving a wireless communication signal in a relatively low frequency band.

According to an embodiment of the disclosure, the electromagnetic waves radiating from the plurality of antenna elements 592 may electromagnetically interact with the conductive portions 521 and 522 of the peripheral part 518. In order to reduce the conductive material on the path of the electromagnetic wave radiating from the plurality of antenna elements 592, a depth of the first region 518*a* may be formed to be relatively thin. According to an embodiment of the disclosure, since the depth of the first region 518*a* overlapping the antenna module 590 is formed to be relatively thin, the electronic device 500 may reduce the influence of the conductive portions 521 and 522 of the peripheral part 518 on transmission and/or reception of a wireless communication signal. According to an embodiment of the disclosure, such a low thickness of the first region 518*a* may improve the radiation performance of the antenna module 590.

FIG. 8B shows a cross-sectional view taken along line C-C' of FIG. 8A including the first non-conductive portion 531 in the first region 518*a*, and includes one (e.g., the third antenna element 592*c*) of the plurality of antenna elements 592. FIG. 8C shows a cross-sectional view taken along line D-D' of FIG. 8A, which does not include the first non-conductive portion 531, in the first region 518*a*, and includes a region between the plurality of antenna elements 592 of the substrate 591.

Referring to FIGS. 8B and 8C, one surface of the substrate 591 may be disposed to face between the second surface 500B and the peripheral part 518. The substrate 591 of the antenna module 590 may be disposed such that a beam formed from the plurality of antenna elements 592 faces an intended direction. For example, in order for a beam formed by the plurality of antenna elements 592 to face the notch 533 of the peripheral part 518, the substrate 591 of the antenna module 590 may be disposed to face between the peripheral part 518 and the second surface 500B.

When a conductive portion (e.g., the conductive portions 521 and 522) included in the peripheral part 518 is located on the path of electromagnetic waves radiating from the antenna elements 592, signals may be distorted or reflected by a conductive material (e.g., metal) included in the conductive portions 521 and 522. The peripheral part 518 may affect the electromagnetic waves, thereby deteriorating the performance (e.g., sensitivity) of the antenna module 590. When the substrate 591 of the antenna module 590 is disposed toward the peripheral part 518, the wireless communication signal may be distorted or reflected by an interaction between the beam formed by the plurality of antenna elements 592 and the conductive portions 521 and 522 of the peripheral part 518.

According to an embodiment of the disclosure, one surface of the substrate 591 on which the plurality of antenna elements 592 are disposed may be disposed to face between the second surface 500B and the peripheral part 518. For example, in order to reduce interference between a beam formed by the plurality of antenna elements 592 and the conductive portion included in the peripheral part 518, the substrate 591 on which the plurality of antenna elements 592 are disposed may be disposed to have an inclination with respect to the peripheral part 518.

According to an embodiment of the disclosure, a direction D3 in which the substrate 591 faces may form an acute angle with respect to a direction D4 extending from the second surface 500B. For example, the direction D3 in which one surface of the substrate 591 on which the plurality of antenna elements 592 are disposed faces may form a specified angle a with respect to the direction D4 extending from the second surface 500B. The specified angle a may be adjusted depending on the thickness T3 of the notch 533, a position of the antenna module 590, or a position of a point where the peripheral part 518 and the second surface 500B make contact with each other. For example, the specified angle a may decrease as the thickness T3 of the notch 533 becomes thicker, and may increase as the thickness T3 of the notch 533 becomes thinner.

Owing to the inclined arrangement of the substrate 591, the plurality of antenna elements 592 may transmit a wireless communication signal in the direction D3 facing between the second surface 500B and the peripheral part 518. According to an embodiment of the disclosure, the electromagnetic waves emitted from the plurality of antenna elements 592 may be transmitted to the outside of the electronic device 500 between the second surface 500B and the peripheral part 518, for example, through the notch 533. When the wireless communication signal is transmitted between the second surface 500B and the peripheral part 518, the influence of the peripheral part 518 including the conductive portions 521 and 522 may be reduced. According to an embodiment of the disclosure, the radiation performance of the antenna module 590 may be improved by reducing the influence of the peripheral part 518 including the conductive portions 521 and 522 on the wireless communication signal.

Referring to FIG. 8D, the electronic device 500 according to an embodiment of the disclosure may make wireless communication with an external electronic device, through a portion S1 of electromagnetic waves radiated to the outside of the electronic device 500 through the first non-conductive portion 531 and the notch 533 and a portion S2 of electromagnetic waves radiated to the outside of the electronic device 500 through an inclined structure of the antenna module 590.

According to an embodiment of the disclosure, the first non-conductive portion 531 overlaps one of the plurality of antenna elements 592 and includes the notch 533 in the first region 518*a*, and therefore the radiation performance of the antenna module 590 disposed inside the housing 510 may be improved.

When there is no first non-conductive portion 531, the depth of the conductive portions (e.g., the first portion 521*a* and the third portion 522*a* of FIG. 8A) disposed in the first region 518*a* may be formed to be relatively thinner, in order to improve the radiation performance of the antenna module 590. For example, when there is no first non-conductive portion 531, the thickness of the conductive portions disposed in the first region 518*a* may be formed to be about 4 mm or more thinner than the thickness of the conductive portions (e.g., the second portion 521*b* and the fourth portion 522*b* of FIG. 8A) disposed in the second region 518*b*, so as to improve the radiation performance of the antenna module 590. If the thicknesses of the conductive portions disposed in the first region 518*a* are formed too thin, the rigidity of the peripheral part 518 may be weakened. As the depth of the conductive portions disposed in the first region 518*a* become thinner, the resonant frequency of the antenna including the first conductive portion 521 may be increased by power feeding. As the path L of the electrical signal is shortened, the resonant frequency of the antenna formed by the first conductive portion 521 may be set in a frequency band relatively higher than the specified resonant frequency. Since the resonant frequency of the antenna formed by the first conductive portion 521 is changed, transmission and/or reception of a wireless communication signal to be transmitted and/or received through the antenna formed by the first conductive portion 521 may not be seamless.

According to an embodiment of the disclosure, a portion S1 of electromagnetic waves radiating from the plurality of antenna elements 592 may be transmitted to the outside of the electronic device 500, for example, the first surface (or front surface) 500A, through the first non-conductive portion 531. The plurality of antenna elements 592 may radiate a wireless communication signal in the form of an electromagnetic wave, and the radiated electromagnetic wave may be transmitted to the outside of the electronic device 500 through the first region 518*a*. According to an embodiment of the disclosure, the intensity of electromagnetic waves passing through the first region 518*a* from the antenna element overlapping the first non-conductive portion 531 among the plurality of antenna elements 592 may be greater than the intensity of electromagnetic waves passing through the first region 518*a* from the remaining antenna elements. For example, when the first non-conductive portion 531 overlaps the third antenna element 592*c*, the intensity of electromagnetic waves radiating from the third antenna element 592*c* and passing through the first region 518*a* may be greater than the intensity of electromagnetic waves radiating from the remaining antenna elements and passing through the first region 518*a*. Since the wireless communication signal may be transmitted through the first non-conductive portion 531, the performance of the antenna module 590 may be secured even if the thicknesses of the conductive portions (e.g., the first portion 521*a* and the third portion 522*a* of FIG. 8A) disposed in the first region 518*a* are formed relatively thicker. For example, when the electronic device 500 includes the first non-conductive portion 531 overlapping one of the plurality of antenna elements 592, the thickness of the conductive portions disposed in the first region 518*a* may be formed to be about 2 mm thinner than the thickness of the conductive portions (e.g., the second portion 521*b* and the fourth portion 522*b* of FIG. 8A) disposed in the second region 518*b*. According to an embodiment of the disclosure, since the thickness of the peripheral part 518 may be secured by a predetermined thickness or more, the rigidity of the peripheral part 518 may be improved.

According to an embodiment of the disclosure, one surface of the substrate 591 on which the plurality of antenna elements 592 are disposed faces between the second surface 500B and the peripheral part 518, and therefore the radiation performance of the antenna module 590 may be improved. When the antenna module 590 faces the peripheral part 518 including the conductive portions 521 and 522, a wireless communication signal radiating from the plurality of antenna elements 592 may be reflected or distorted by the conductive portions 521 and 522. According to an embodiment of the disclosure, as one surface of the substrate 591 faces between the second surface 500B and the peripheral part 518, the portion S2 of the electromagnetic waves radiating from the plurality of antenna elements 592 may be transmitted to the outside of the electronic device 500 through between the second surface 500B and the peripheral part 518.

Figure 9:
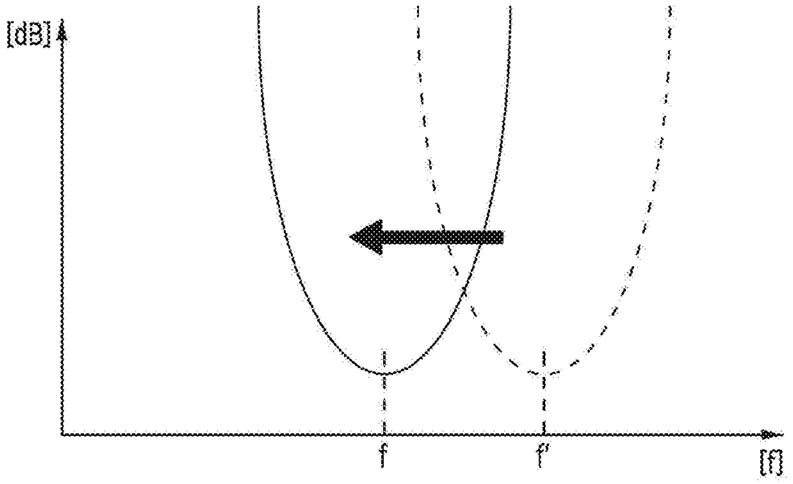
FIG. 9 is a graph illustrating a magnitude of a reflection coefficient of an antenna formed by a conductive portion of an electronic device, according to an embodiment of the disclosure.

FIG. 9 is a graph illustrating a magnitude of a reflection coefficient of an antenna formed by a conductive portion of an electronic device according to an embodiment of the disclosure.

The horizontal axis of the graph of FIG. 9 indicates a frequency (in units of MHz), and the vertical axis of the graph indicates a magnitude value (in units of dB) of the reflection coefficient S11.

Referring to FIG. 9, in order to transmit and/or receive a wireless communication signal in a designated second frequency band, the resonant frequency of the antenna formed by the first conductive portion (e.g., the first conductive portion 521 of FIG. 8A) may be set to a resonant frequency f of the second frequency band. The resonant frequency of the antenna formed by the first conductive portion 521 may be determined by a path (e.g., the path L of the electrical signal of FIG. 8A) of an electrical signal formed in the first conductive portion 521. For example, the resonant frequency of the antenna formed by the first conductive portion 521 may be set based on the length from a feeding point (e.g., the feeding point P of FIG. 8A) of the first conductive portion 521 to the end portion 521*e* of the first conductive portion 521 in contact with the first non-conductive portion (e.g., the first non-conductive portion 531 of FIG. 8A).

According to an embodiment of the disclosure, the electronic device (e.g., the electronic device 500 of FIG. 8A) may be configured to communicate with a wireless communication signal in the second frequency band, which is a relatively low frequency band, through the antenna formed by the first conductive portion 521. In order to communicate with a wireless communication signal in the second frequency band, an electrical length of an antenna having a predetermined length or more may be required.

According to an embodiment of the disclosure, the path L of the electrical signal formed by power feeding may be established from the feeding point P to the end portion 521*e* of the first conductive portion 521 with which the first non-conductive portion 531 is in contact. According to an embodiment of the disclosure, the position of the first non-conductive portion 531 may be disposed in a first region (e.g., the first region 518*a* of FIG. 8A) overlapping the antenna module (e.g., the antenna module 590 of FIG. 8A) of the peripheral part (e.g., the peripheral part 518 of FIG. 8A), such that the resonant frequency of the antenna formed by the first conductive portion 521 may have the resonant frequency f in the second frequency band.

When the first non-conductive portion 531 is positioned in a second region (e.g., the second region 518*b* of FIG. 8A) different from the first region 518*a*, the resonant frequency of the antenna formed by the first conductive portion 521 may be out of the second frequency band. For example, when the first non-conductive portion 531 is positioned closer to the feeding point P than the first region 518*a*, the length of the path L of the electrical signal may be reduced. As the length of the path L of the electrical signal is reduced, the resonant frequency of the antenna formed by the first conductive portion 521 may be set to the resonant frequency f' in a frequency band higher than the frequency in the second frequency band. When the resonant frequency of the antenna formed by the first conductive portion 521 is set to the resonant frequency f' in a frequency band higher than the second frequency band, transmission and/or reception of the signal in the second frequency band may not be seamless. The electronic device 500 may require a separate configuration (e.g., an impedance matching circuit) for adjusting the resonant frequency.

According to an embodiment of the disclosure, the electronic device 500 may include the first non-conductive portion 531 in the first region 518*a*. Since the radiation performance of the antenna module 590 is improved through the first non-conductive portion 531, the electronic device 500 may form the thickness of the conductive portions 521 and 522 of the first region 518*a* to be thicker. For example, when the peripheral part 518 does not include the first non-conductive portion 531, a difference between the thickness of the conductive portions (e.g., the first portion 521*a* and the third portion 522*a* of FIG. 8A) disposed in the first region 518*a* and the thickness of the conductive portions (e.g., the second portion 521*b* and the fourth portion 522*b* of FIG. 8A) disposed in the second region 518*b* may be greater than or equal to a first length (e.g., about 4 mm). When the peripheral part 518 includes the first non-conductive portion 531, the difference between the thickness of the conductive portions disposed in the first region 518*a* and the thickness of the conductive portions disposed in the second region 518*b* may be a second length (e.g., about 2 mm) shorter than the first length.

According to an embodiment of the disclosure, in the peripheral part 518 including the first non-conductive portion 531, the first portion 521*a* and the third portion 522*a* disposed in the first region 518*a* have a lager thickness, and therefore the path L of the electrical signal flowing through the first conductive portion 521 by the power feeding may be established from the feeding point P to the end portion of the first conductive portion 521 in contact with the first non-conductive portion 531. The electronic device 500 according to an embodiment of the disclosure may secure the length of the first conductive portion 521 capable of having the resonant frequency f in the second frequency band. The electronic device 500 may communicate with an external electronic device with a wireless communication signal in a relatively low second frequency band, through an antenna formed by the first conductive portion 521.

Figure 10A:
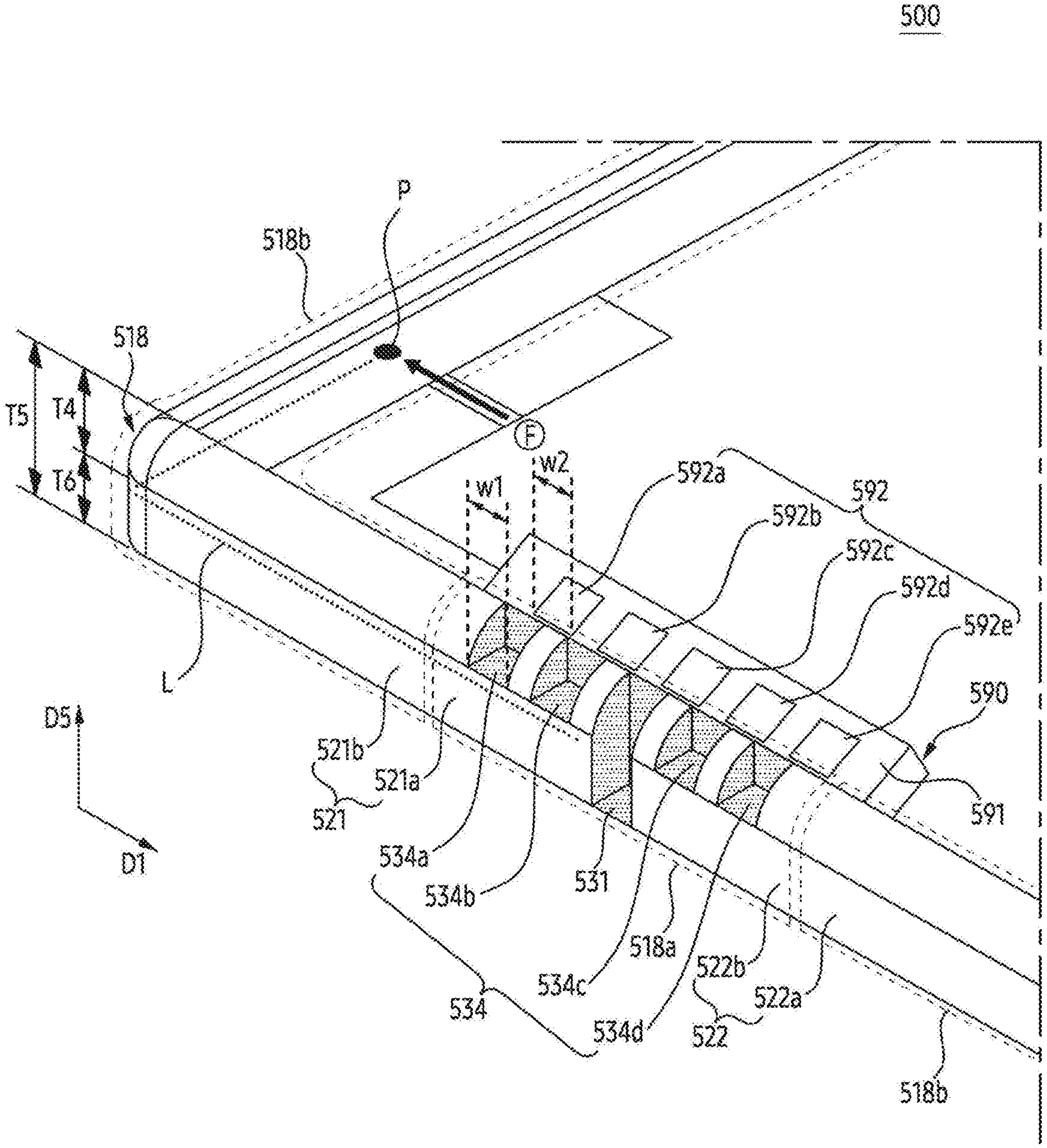
FIG. 10A shows an enlarged example of part A of FIG. 7 according to an embodiment of the disclosure.

FIG. 10A shows an enlarged example of part A of FIG. 7 according to an embodiment of the disclosure.

Figure 10B:
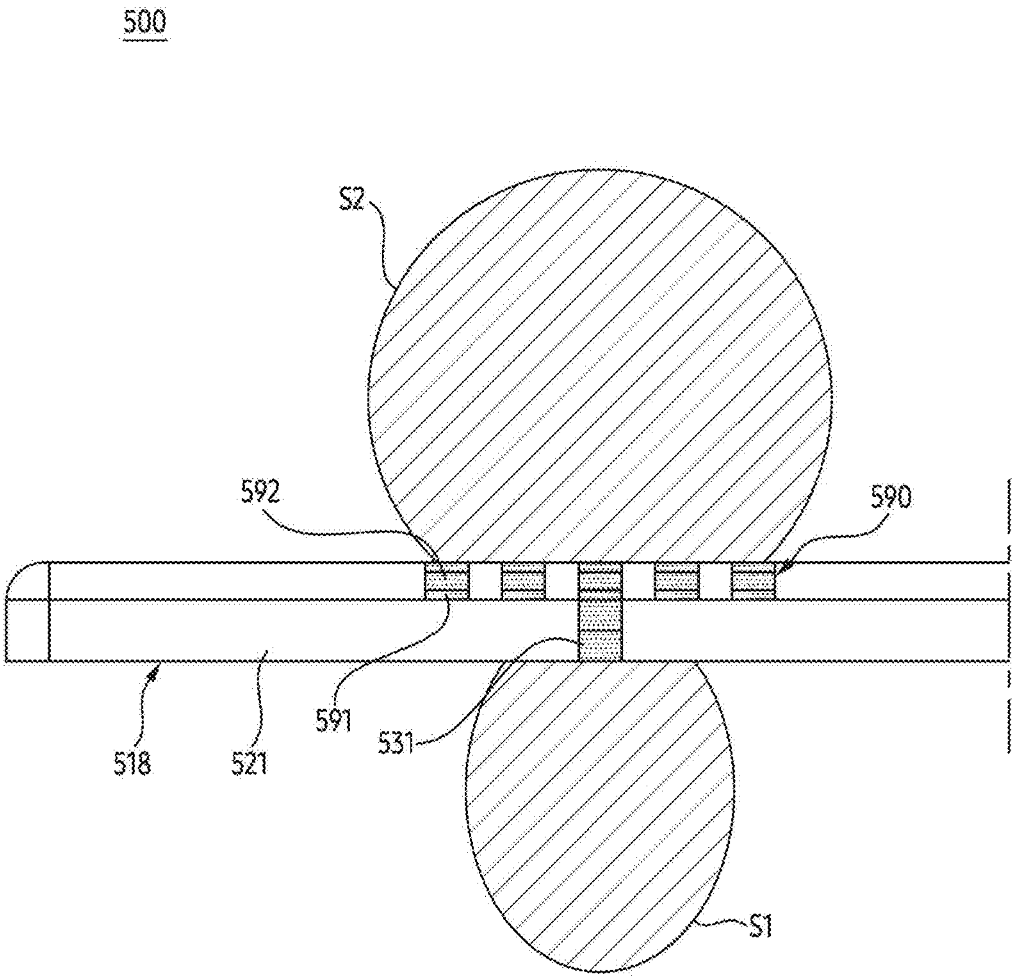
FIG. 10B is a schematic side view of a peripheral part of the electronic device shown in FIG. 10A as viewed vertically according to an embodiment of the disclosure.

FIG. 10B is a schematic side view of the peripheral part 518 of the electronic device 500 shown in FIG. 10A as viewed vertically according to an embodiment of the disclosure.

Referring to FIG. 10A, the peripheral part 518 may include a plurality of notches 534 in positions corresponding to regions overlapping the plurality of antenna elements 592 of the substrate 591 in the first region 518*a*. When the second side 500C-2 is viewed in the direction D2, the plurality of notches 534 may overlap at least one of regions in which the plurality of antenna elements 592 are formed on the substrate 591. The plurality of notches 343 may include substantially the same material as the first non-conductive portion 531. The plurality of notches 343 may be disposed in the first region 518*a* overlapping the antenna module 590.

For example, the antenna module 590 may include first to fifth antenna elements 592*a*, 592*b*, 592*c*, 592*d*, and 592*e* spaced apart from each other. The plurality of notches 534 may correspond one-to-one to the plurality of antenna elements 592, respectively. The conductive portions 521 and 522 may include a first notch 534*a* corresponding to the first antenna element 592*a*, a second notch 534*b* corresponding to the second antenna element 592*b*, a third notch 534*c* corresponding to the fourth antenna element 592*d*, and/or a fourth notch 534*d* corresponding to the fourth antenna element 592*d*. The first non-conductive portion 531 may be disposed between the second notch 534*b* and the third notch 534*d*.

The width of each of the plurality of notches 534 may be greater than the width of the plurality of antenna elements 592 to allow passage of electromagnetic waves radiating from the antenna module 590. For example, the width w1 of the first notch 534*a* may be greater than the width w2 of the first antenna element 592*a*. The thickness T4 of the plurality of notches 534 may be substantially the same as the difference between the thickness T5 of the second region 518*b* and the thickness T6 of the first region 518*a*. For example, when the difference between the thickness T5 of the second region 518*b* and the thickness T6 of the first region 518*a* is about 2 mm, the thickness T4 of the plurality of notches 534 may be about 2 mm, but the disclosure is not limited thereto.

According to an embodiment of the disclosure, electromagnetic waves radiating from the plurality of antenna elements 592 may be transmitted to the outside of the electronic device 500 through the plurality of notches 534. For example, the electromagnetic waves radiating from the first antenna element 592*a* may be transmitted to the outside of the electronic device 500 through the first notch 534*a* facing the first antenna element 592*a*.

Referring to FIG. 10B, the electronic device 500 according to an embodiment may wirelessly communicate with an external electronic device through a portion S1 of electromagnetic waves radiated to the outside of the electronic device 500 through the first non-conductive portion 531 and the plurality of notches 534 and/or a portion S2 of electromagnetic waves radiated to the outside of the electronic device 500 through a structure of the antenna module 590 disposed to be inclined. The portion S1 of electromagnetic waves radiated to the outside of the electronic device 500 through the first non-conductive portion 531 and the plurality of notches 534 may be radiated to the outside of the electronic device 500 through the plurality of notches 534 of the first region 518*a*. The electronic device 500 illustrated in FIG. 10B may have radiation performance similar to that of the electronic device 500 illustrated in FIG. 8D.

According to an embodiment of the disclosure, when the conductive portions 521 and 522 include the plurality of notches 534, the rigidity of the peripheral part 518 may be secured compared to a case where the thickness of the conductive portions included in the first region 518*a* are formed to be generally thin. For example, since protrusions of the same material (e.g., metal) as the conductive portions 521 and 522 are formed between the plurality of notches 534 of the first region 518*a*, the peripheral part 518 may have higher rigidity than when a space formed by the difference between the thickness of the conductive portions disposed in the second region 518*b* and the thickness of the conductive portions disposed in the first region 518*a* is formed as an empty space or filled with a non-conductive material.

Figure 11A:
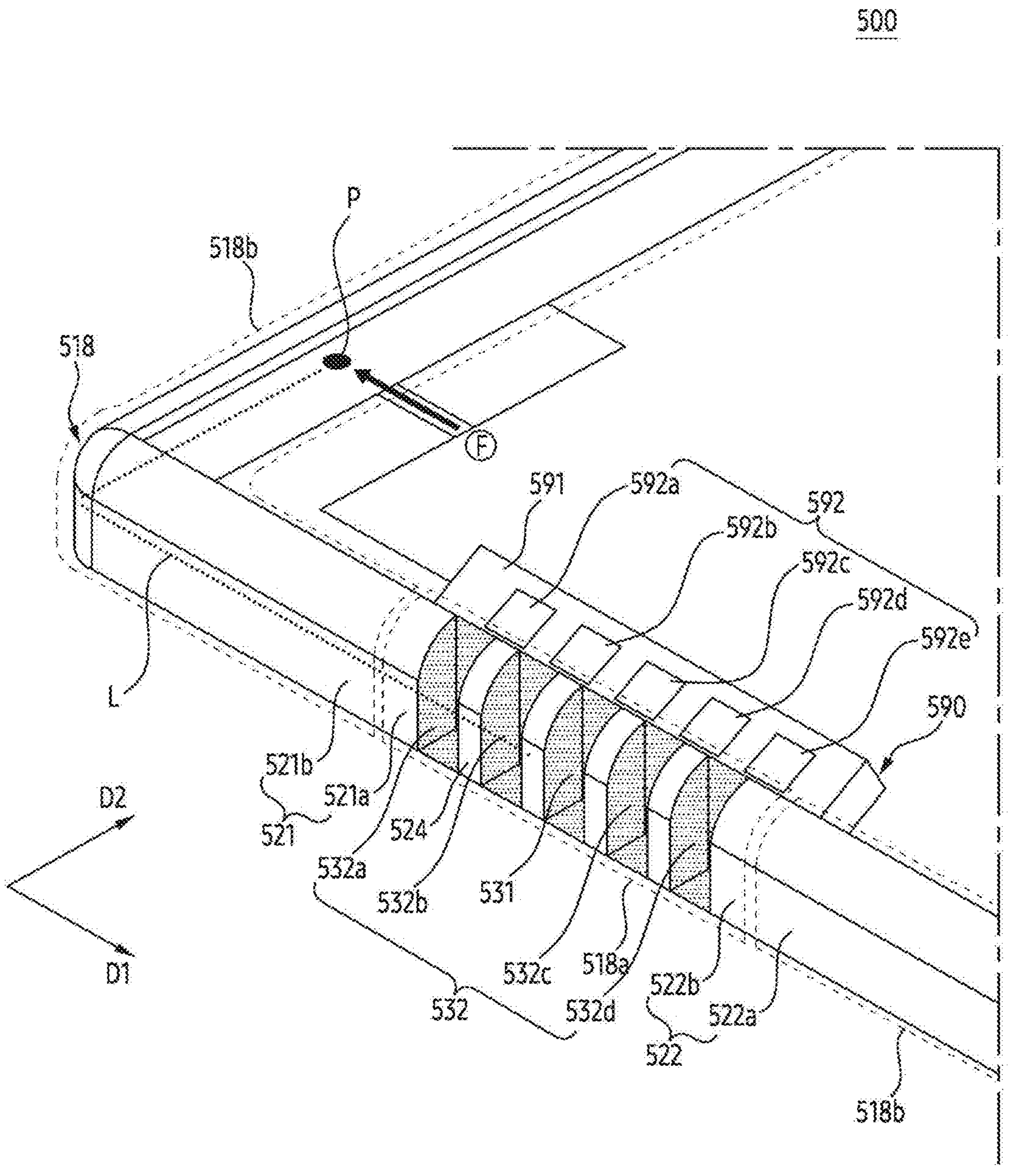
FIG. 11A shows an enlarged example of part A of FIG. 7 according to an embodiment of the disclosure.

FIG. 11A shows an enlarged view of part A of FIG. 7 according to an embodiment of the disclosure.

Figure 11B:
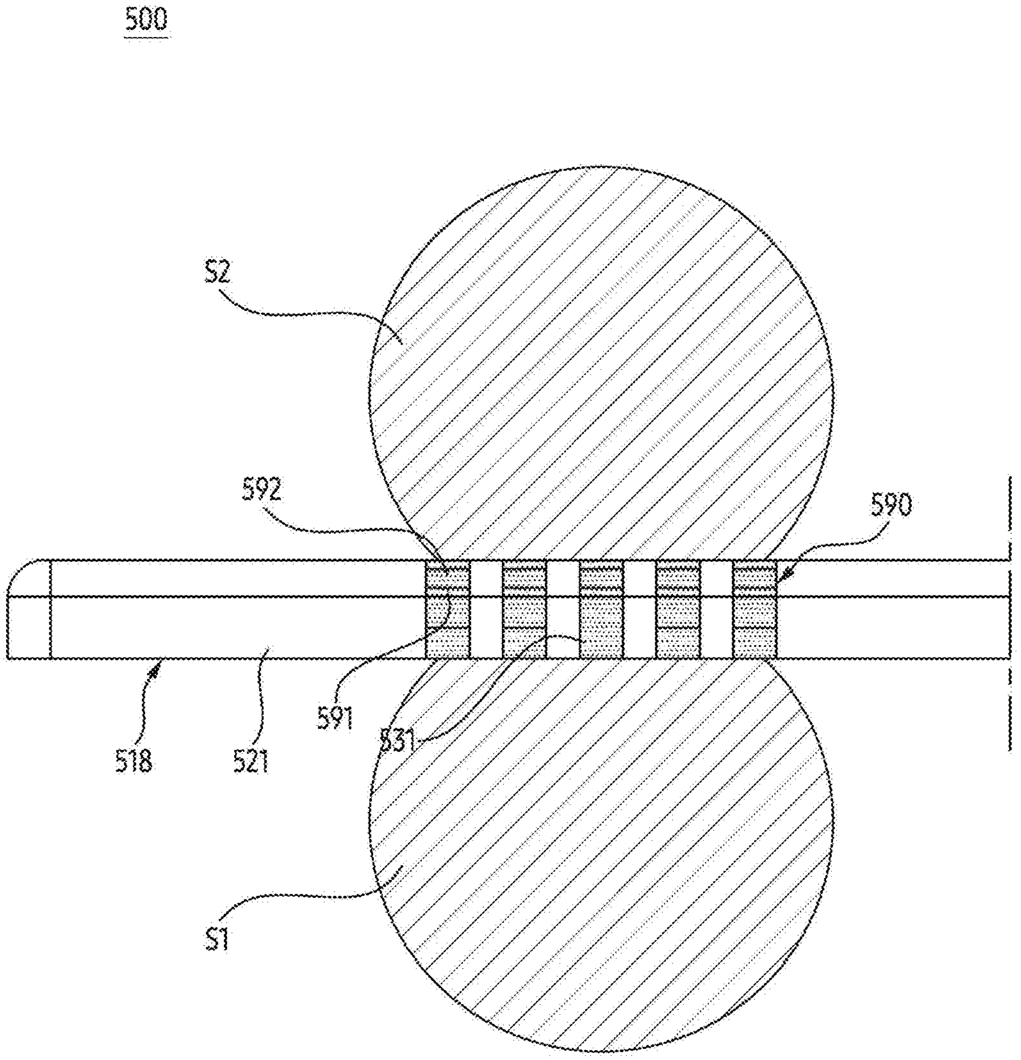
FIG. 11B is a schematic side view of the peripheral part of the electronic device shown in FIG. 11A as viewed vertically according to an embodiment of the disclosure.

FIG. 11B shows a schematic side view of the peripheral part of the electronic device illustrated in FIG. 11A as viewed vertically according to an embodiment of the disclosure.

Referring to FIG. 11A, the peripheral part 518 may further include second non-conductive portions 532 spaced apart from the first non-conductive portion 531 in a direction parallel to the peripheral part 518 (e.g., in a direction D1 or −D1). The second non-conductive portions 532 may be spaced apart from the first conductive portion 521 along a direction D1 in which the second side 500C-2 extends. A plurality of second non-conductive portions 532 may be spaced apart from each other along the direction D1 in which the second side 500C-2 extends.

According to an embodiment of the disclosure, the first non-conductive portion 531 and the plurality of second non-conductive portions 532 may be configured to overlap the plurality of antenna elements 592, when the peripheral part 518 is viewed in the direction D2 perpendicular to the direction D1. The plurality of second non-conductive portions 532 may correspond to the plurality of antenna elements 592 one-to-one. According to an embodiment of the disclosure, the antenna module 590 may include first to fifth antenna elements 592*a*, 592*b*, 592*c*, 592*d*, and 592*e* spaced apart from each other. The first non-conductive portion 531 may overlap the third antenna element 592*c* when the peripheral part 518 is viewed in the direction D2. The plurality of second non-conductive portions 532 may overlap the first antenna element 592*a*, the second antenna element 592*b*, the fourth antenna element 592*d*, and the fifth antenna element 592*e*, respectively, when the peripheral part 518 is viewed in the direction D2. For example, the plurality of second non-conductive portions 532 may include, although are not limited to, a second non-conductive portion 532*a* corresponding to the first antenna element 592*a*, a second non-conductive portion 532*b* corresponding to the second antenna element 592*b*, a second non-conductive portion 532*c* corresponding to the fourth antenna element 592*d*, and/or a second non-conductive portion 532*d* corresponding to the fifth antenna element 592*e*.

Referring to FIG. 11B, the electronic device 500 according to an embodiment may wirelessly communicate with an external electronic device through a portion S1 of electromagnetic waves radiating from the antenna module 590 to the outside of the electronic device 500 through the first non-conductive portion 531 and the plurality of second non-conductive portions 532, and a portion S2 of electromagnetic waves radiating from the antenna module 590 to the outside of the electronic device 500 through a structure of the antenna module 590 disposed to be inclined. The electronic device 500 according to an embodiment of the disclosure may radiate the portion S1 of the electromagnetic wave radiating from the antenna module 590 through the side of the electronic device 500 to the outside of the electronic device 500, using the first non-conductive portion 531 and the plurality of second non-conductive portions 532 formed in the peripheral part 518, and thus the radiation performance in the portion S1 of the electromagnetic wave may be improved compared to the electronic device 500 illustrated in FIG. 8D.

The electronic device 500 according to an embodiment of the disclosure may further include a connection member (not shown) capable of electrically connecting the first non-conductive portion 531 and the plurality of second non-conductive portions 532. For example, the connection member may include a switch capable of adjusting the electrical connection between the first non-conductive portion 531 and the plurality of second non-conductive portions 532 or a wire electrically connected to the first non-conductive portion 531 and the plurality of second non-conductive portions 532, but the disclosure not limited thereto. The connecting member may electrically connect the segmented conductive portion between the first non-conductive portion 531 and the plurality of second non-conductive portions 532, thereby adjusting the length of the first conductive portion 521. For example, referring to FIG. 11A, the connecting member may electrically connect the conductive portion 524 disposed between the first non-conductive portion 532*a* and the second non-conductive portion 532*a*, thereby extending the length of the first conductive portion 521 up to the conductive portion 524. By securing the length of the antenna formed by the first conductive portion 521 by means of the connecting member, the resonant frequency of the antenna formed by the first conductive portion 521 may be set to the resonant frequency in the second frequency band.

Figure 12:
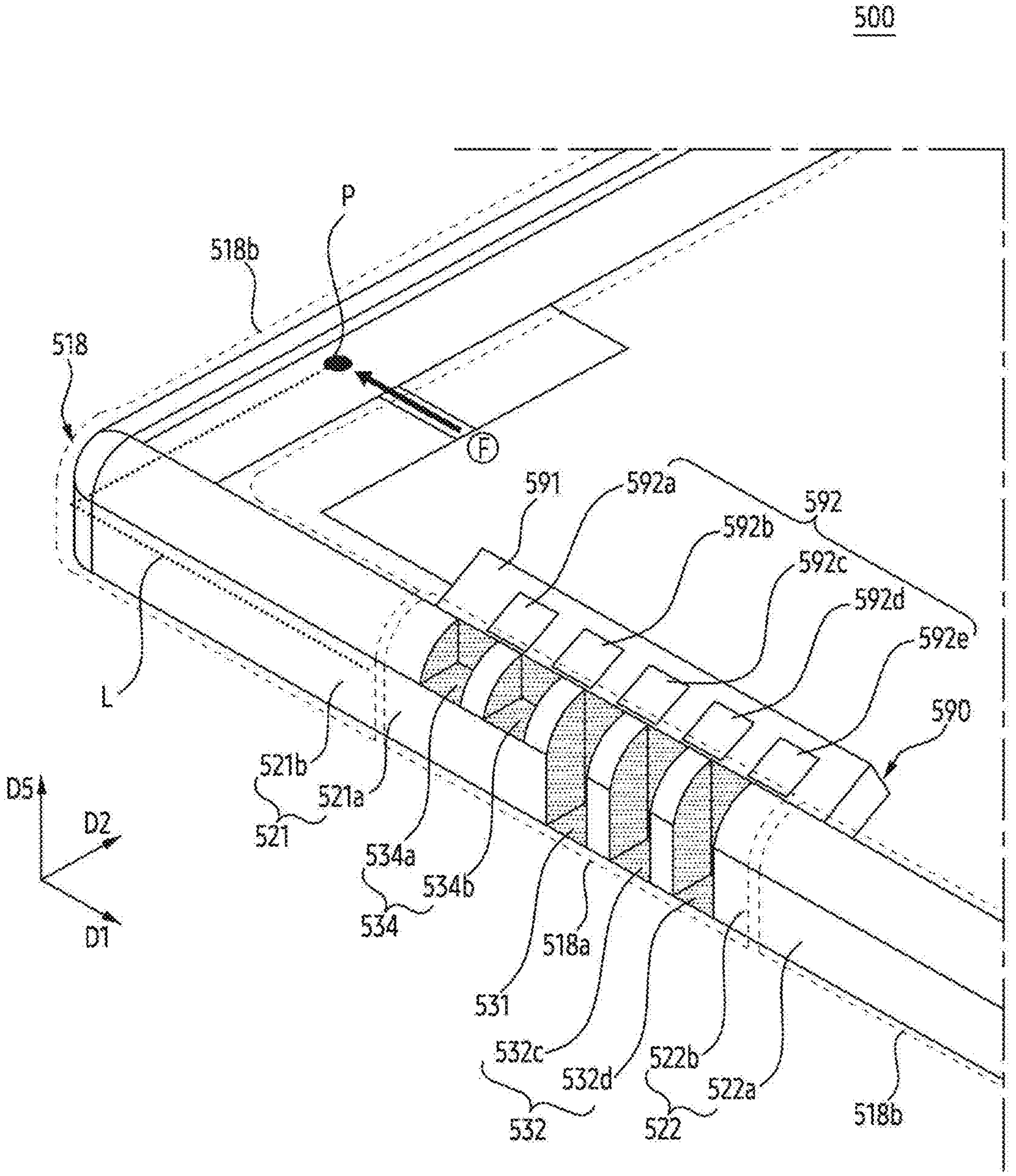
FIG. 12 shows an enlarged example of part A of FIG. 7 according to an embodiment of the disclosure.

FIG. 12 shows an enlarged view of part A of FIG. 7 according to an embodiment of the disclosure.

According to an embodiment of the disclosure, the peripheral part 518 may include a plurality of notches 534 and/or a plurality of second non-conductive portions 532. The plurality of notches 534 of FIG. 12 may be referred to as the plurality of notches 534 of FIG. 10A. The plurality of second non-conductive portions 532 of FIG. 12 may be referred to as the plurality of second non-conductive portions 532 of FIG. 11A. A redundant description of the plurality of notches 534 and the plurality of second non-conductive portions 532 will be omitted.

Referring to FIG. 12, when the peripheral part 518 is viewed in the direction D2, the peripheral part 518 may include a plurality of notches 534 overlapping some of the plurality of antenna elements 592, and a plurality of non-conductive portions (e.g., the first non-conductive portion 531 and the second non-conductive portions 532). For example, when the peripheral part 518 is viewed in the direction D2, the peripheral part 518 may include a first notch 534*a* overlapping the first antenna element 592*a*, a second notch 534*b* overlapping the second antenna element 592*b*, a first non-conductive portion 531 overlapping the third antenna element 592*c*, a second non-conductive portion 532*c* overlapping the fourth antenna element 592*d*, and a second non-conductive portion 532*d* overlapping the fifth antenna element 592*e*. Electromagnetic waves radiating from the antenna module 590 may be transmitted to the outside of the electronic device 500 via the plurality of notches 534 and the plurality of non-conductive portions (e.g., the first non-conductive portion 531 and the second non-conductive portions 532).

According to an embodiment of the disclosure, the arrangement of the plurality of notches 534 and the plurality of non-conductive portions (e.g., the first non-conductive portion 531 and the second non-conductive portions 532) is not limited to the above-described embodiment. The plurality of notches 534 and the plurality of non-conductive portions (e.g., the first non-conductive portion 531 and the second non-conductive portion 532) may be arranged in various manners in a region corresponding to each of the plurality of antenna elements 592, when the peripheral part 518 is viewed in the direction D2. When the peripheral part 518 is viewed in the direction D2, the peripheral part 518 may include a second—a non-conductive portion (e.g., the non-conductive portion 532*a* of FIG. 11A) overlapping the first antenna element 592*a*, a second-b non-conductive portion (e.g., the second non-conductive portion 532*b* of FIG. 11A) overlapping the second antenna element 592*b*, a first non-conductive portion 531 overlapping the third antenna element 592*c*, a third notch (e.g., the third notch 534*c* of FIG. 10A) overlapping the fourth antenna element 592*d*, and a fourth notch (e.g., the fourth notch 534*d* of FIG. 10A) overlapping the fifth antenna element 592*e*. As another example, a plurality of non-conductive portions (e.g., the first non-conductive portion 531 and the second non-conductive portions 532) may be disposed between the plurality of notches 534, or vice versa.

The electronic device 500 according to an embodiment of the disclosure may secure the rigidity of the peripheral part 518, owing to including the plurality of notches 534, and may increase the strength of the wireless communication signal radiated to the outside of the electronic device 500 through the side of the electronic device 500, owing to including a first non-conductive portion 531 and a plurality of second non-conductive portions.

According to an embodiment of the disclosure, an electronic device (e.g., the electronic device 500 of FIG. 7) may comprise a housing (e.g., the housing 510 of FIG. 5) and an antenna module (e.g., the antenna module 590 of FIG. 8A).

According to an embodiment of the disclosure, the housing may include a first surface (e.g., the first surface 500A of FIG. 5) on which a display (e.g., the display 501 of FIG. 5) is disposed, a second surface (e.g., the second surface 500B of FIG. 5) opposite to the first surface, and a peripheral part (e.g., the peripheral part 518 of FIG. 8A) surrounding a space between the first surface and the second surface and including a conductive portion (e.g., the conductive portions 521 and 522 of FIG. 8A) and a first non-conductive portion (e.g., the first non-conductive portion 531 of FIG. 8A) in contact with an end portion (e.g., the end portion 521*e* of FIG. 8A) of the conductive portion.

According to an embodiment of the disclosure, the antenna module may include a substrate (e.g., the substrate 591 of FIG. 8A) disposed inside the housing and disposed in a direction parallel to the peripheral part, and a plurality of antenna elements (e.g., the plurality of antenna elements 592 of FIG. 8A) spaced apart from each other in the direction on one surface of the substrate.

According to an embodiment of the disclosure, when the peripheral part is viewed vertically, the peripheral part may include a first region (e.g., the first region 518*a* of FIG. 8A) overlapping the antenna module and a second region (e.g., the second region 518*b* of FIG. 8A) including the conductive portion having a thickness greater than a thickness of the conductive portion included in the first region.

According to an embodiment of the disclosure, when the peripheral part is viewed vertically, the first non-conductive portion may overlap one of the plurality of antenna elements in the first region.

According to an embodiment of the disclosure, the conductive portion may extend up to one of regions in which the plurality of antenna elements of the substrate are spaced apart from each other.

According to an embodiment of the disclosure, the electronic device may include wireless communication circuitry (e.g., the wireless communication module 192 of FIG. 1) electrically connected to the antenna module and the conductive portion. The wireless communication circuitry may be configured to communicate with an external electronic device based on signals in a first frequency band through the antenna module, and communicate with the external electronic device based on signals in a second frequency band different from the first frequency band through the conductive portion.

According to an embodiment of the disclosure, the second frequency band may be lower than the first frequency band.

According to an embodiment of the disclosure, the first frequency band may be in a range of 3 GHz to 60 GHz.

According to an embodiment of the disclosure, the one surface of the substrate may be inclined toward a space between the second surface and the peripheral part.

According to an embodiment of the disclosure, the peripheral part may include a plurality of notches (e.g., the plurality of notches 534 of FIG. 10A) overlapping the plurality of antenna elements in the first region, when the peripheral part is viewed vertically. The plurality of notches may include a non-conductive material.

According to an embodiment of the disclosure, the first non-conductive portion may be disposed on the conductive portion of the first region.

According to an embodiment of the disclosure, the peripheral part may further include a plurality of second non-conductive portions (e.g., the plurality of second non-conductive portions 532 of FIG. 11A) spaced apart from the first non-conductive portion in a direction parallel to the peripheral part.

According to an embodiment of the disclosure, the first non-conductive portion and the plurality of second non-conductive portions may overlap the plurality of antenna elements, when the peripheral part is viewed vertically.

According to an embodiment of the disclosure, the first non-conductive portion and the plurality of second non-conductive portions may correspond to the plurality of antenna elements one-to-one.

According to an embodiment of the disclosure, the peripheral part may include a plurality of notches (e.g., the plurality of notches 534 of FIG. 12) including a non-conductive material, and a plurality of second non-conductive portions (e.g., the plurality of second non-conductive portions 532 of FIG. 12) spaced apart from the first non-conductive portion in a direction parallel to the peripheral part. The plurality of notches, the first non-conductive portion, and the plurality of second non-conductive portions may overlap the plurality of antenna elements in the first region when the peripheral part is viewed vertically. The plurality of notches, the first non-conductive portion, and the plurality of second non-conductive portions may correspond to the plurality of antenna elements one-to-one.

According to an embodiment of the disclosure, a width of each of the plurality of notches may be greater than a width of each of the plurality of antenna elements.

According to an embodiment of the disclosure, the first non-conductive portion and the plurality of second non-conductive portions may overlap some of the plurality of antenna elements when the peripheral part is viewed vertically.

According to an embodiment of the disclosure, an intensity of electromagnetic waves passing through the first region from an antenna element overlapping the first non-conductive portion among the plurality of antenna elements may be greater than an intensity of electromagnetic waves passing through the first region from remaining antenna elements.

According to an embodiment of the disclosure, the plurality of antenna elements may operate as patch antennas.

According to an embodiment of the disclosure, an electronic device may comprise a housing, an antenna module, and wireless communication circuitry.

According to an embodiment of the disclosure, the housing may include a first conductive portion disposed on a portion of a first side (e.g., the first side 500C-1 of FIG. 8A) and a portion of a second side (e.g., the second side 500C-2 of FIG. 8A) perpendicular to the first side, a second conductive portion spaced apart from the first conductive portion, and a non-conductive portion disposed between the first conductive portion and the second conductive portion.

According to an embodiment of the disclosure, the antenna module may include a substrate disposed in a direction parallel to the second side inside the housing and a plurality of antenna elements spaced apart from each other on one surface of the substrate in the direction.

According to an embodiment of the disclosure, the wireless communication circuitry may be electrically connected to the antenna module and the conductive portion.

According to an embodiment of the disclosure, when the second side is viewed vertically, the non-conductive portion may overlap one of the plurality of antenna elements.

According to an embodiment of the disclosure, the wireless communication circuitry may be configured to transmit or receive a wireless communication signal in a specified band by feeding power to a feeding point (e.g., the feeding point P of FIG. 8A) positioned on the first side of the conductive portion.

According to an embodiment of the disclosure, when the second side is viewed vertically, the first conductive portion may include a first portion (e.g., the first portion 521*a* of FIG. 8A) overlapping the antenna module and a second portion (e.g., the second portion 521*b* of FIG. 8A) thicker than the first portion.

According to an embodiment of the disclosure, when the second side is viewed vertically, the second conductive portion may include a third portion (e.g., the third portion 522*a* of FIG. 8A) overlapping the antenna module and a fourth portion (e.g., the fourth portion 522*b* of FIG. 8A) thicker than the third portion.

According to an embodiment of the disclosure, when the second side is viewed vertically, the peripheral part may further include a plurality of notches (e.g., the plurality of notches 534 of FIG. 12) overlapping the plurality of antenna elements and including a non-conductive material.

According to an embodiment of the disclosure, the first conductive portion may extend up to one of regions in which the plurality of antenna elements of the substrate are spaced apart from each other.

According to an embodiment of the disclosure, the wireless communication circuitry may be configured to communicate with an external electronic device through the antenna module based on signals in a first frequency band, and to communicate with the external electronic device through the first conductive portion based on signals in a second frequency band lower than the first frequency band.

According to an embodiment of the disclosure, the electronic device may further include a display and a rear plate (e.g., the rear plate 511 of FIG. 5) disposed on a second surface opposite to a first surface on which the display is disposed.

According to an embodiment of the disclosure, the one surface of the substrate may be inclined toward a space between the rear plate and the side.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may be interchangeably used with other terms, for example, "logic", "logic block", "unit", "part", "portion", or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

No claim element is to be construed under the provisions of 35 U.S.C. § 112, sixth paragraph, unless the element is expressly recited using the phrase "means for" or "means."

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a housing including a peripheral part forming a lateral side of the electronic device, the peripheral part including:

a first conductive portion including a first section and a second section thinner than the first section of the first conductive portion, wherein the first conductive portion is configured to function as an antenna, a second conductive portion including a third section and a fourth section, the third section being closer to the second section of the first conductive portion than to the first section of the first conductive portion, wherein the third section of the second conductive portion is thinner than the fourth section of the second conductive portion, and a first non-conductive portion between the second section and the third section such that the first conductive portion is electrically isolated from the second conductive portion; and an antenna module distinct from the antenna including the first conductive portion, the antenna module including:

a substrate, in the housing, disposed in a direction parallel to a portion of the peripheral part, and a plurality of antenna elements disposed on a surface of the substrate and spaced apart from each other in the direction, wherein the antenna module is disposed to overlap a notch portion of the peripheral part and the first non-conductive portion, and wherein the notch portion is formed by a difference in thickness between the first and second sections of the first conductive portion and a difference in thickness between the third and fourth sections of the second conductive portion.

2. The electronic device of claim 1, wherein the first conductive portion extends to a region of the peripheral part that overlaps one of regions of the substrate where the plurality of antenna elements are spaced apart.

3. The electronic device of claim 1, further comprising:

wireless communication circuitry electrically connected to the antenna module and the first conductive portion, wherein the wireless communication circuitry is configured to:

communicate with an external electronic device through the antenna module based on signals on a first frequency band, and communicate with the external electronic device through the first conductive portion based on signals on a second frequency band different from the first frequency band.

4. The electronic device of claim 3, wherein the second frequency band is lower than the first frequency band.

5. The electronic device of claim 3, wherein the first frequency band is in a range of 3 GHz to 60 GHz.

6. The electronic device of claim 1, wherein the surface of the substrate faces between a second surface and the peripheral part.

7. The electronic device of claim 1, wherein the notch portion comprises a plurality of notches overlapping the plurality of antenna elements, when the peripheral part is viewed vertically, and comprising a non-conductive material.

8. The electronic device of claim 1, wherein the peripheral part includes a plurality of second non-conductive portions spaced apart from the first non-conductive portion in the direction.

9. The electronic device of claim 8, wherein the first non-conductive portion and the plurality of second non-conductive portions overlap the plurality of antenna elements, when the peripheral part is viewed vertically, and wherein the first non-conductive portion and the plurality of second non-conductive portions have a one-to-one correspondence with the plurality of antenna elements.

10. The electronic device of claim 1, wherein the peripheral part includes:

a plurality of notches comprising a non-conductive material, and a plurality of second non-conductive portions spaced apart from the first non-conductive portion in the direction, wherein the plurality of notches, the first non-conductive portion and the plurality of second non-conductive portions overlap the plurality of antenna elements in a first region, when the peripheral part is viewed vertically, and wherein the plurality of notches, the first non-conductive portion and the plurality of second non-conductive portions have a one-to-one correspondence with the plurality of antenna elements.

11. The electronic device of claim 10, wherein a width of each of the plurality of notches is wider than a width of each of the plurality of antenna elements.

12. The electronic device of claim 1, wherein intensity of electromagnetic waves passing through the notch portion and the first non-conductive portion from an antenna element, among the plurality of antenna elements, overlapping the first non-conductive portion is greater than intensity of electromagnetic waves passing through the notch portion and the first non-conductive portion from another antenna element.

13. The electronic device of claim 1, wherein the plurality of antennas elements are configured to function as patch antenna.

14. The electronic device of claim 1, further comprising:

wireless communication circuitry electrically connected to the antenna module and the first conductive portion, wherein the wireless communication circuitry is configured to transmit or receive signals on a designated frequency band by feeding a feeding point of the first conductive portion, and wherein the feeding point is positioned in another portion of the peripheral part perpendicular to the portion of the peripheral part parallel to the substrate of the antenna module.

15. The electronic device of claim 1, wherein a resonance frequency of the antenna including the first conductive portion is based on a length of a transmission path formed from a feeding point of the first conductive portion to an end portion of the first conductive portion that contacts the non-conductive portion.

16. An electronic device comprising:

a housing including a peripheral part forming at least a portion of a lateral side of the electronic device, the peripheral part including:

a first conductive portion including a first section and a second section thinner than the first section of the first conductive portion, wherein the first conductive portion is configured to function as an antenna, a second conductive portion, spaced apart from the first conductive portion, including a third section and a fourth section, the third section being closer to the second section of the first conductive portion than to the first section of the first conductive portion, wherein the third section of the second conductive portion is thinner than the fourth section of the second conductive portion, and a non-conductive portion disposed between the first conductive portion and the second conductive portion; and an antenna module different from the antenna, the antenna module including:

a substrate, in the housing, disposed in a direction parallel to the peripheral part, and a plurality of antenna elements spaced apart from each other on one surface of the substrate in the direction; and wireless communication circuitry electrically connected to the antenna module and the first conductive portion configured to function as the antenna, wherein the antenna module is disposed to overlap a notch portion of the peripheral part and the non-conductive portion, and wherein the notch portion is formed by a difference in thickness between the first and second sections of the first conductive portion and a difference in thickness between the third and fourth sections of the second conductive portion.

17. The electronic device of claim 16, wherein the notch portion comprises a plurality of notches overlapping the plurality of antenna elements filled with a non-conductive material.

18. The electronic device of claim 16, wherein the first conductive portion extends to one of regions of the substrate where the plurality of antenna elements are spaced apart.

19. The electronic device of claim 16, further comprising:

a display defining a front surface of the electronic device; and a rear plate opposite to the display, wherein the one surface of the substrate faces between the rear plate and the peripheral part.

20. The electronic device of claim 16, wherein a resonance frequency of the antenna including the first conductive portion is based on a length of a transmission path formed from a feeding point of the first conductive portion to an end portion of the first conductive portion that contacts with the non-conductive portion.

* * * * *